(12) United States Patent
Taniguchi et al.

(10) Patent No.: US 10,910,881 B2
(45) Date of Patent: Feb. 2, 2021

(54) ELECTRONIC APPARATUS

(71) Applicant: KABUSHIKI KAISHA TOSHIBA, Tokyo (JP)

(72) Inventors: Kentaro Taniguchi, Kawasaki Kanagawa (JP); Tomoko Adachi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 44 days.

(21) Appl. No.: 16/299,102

(22) Filed: Mar. 11, 2019

(65) Prior Publication Data
US 2020/0076239 A1 Mar. 5, 2020

(30) Foreign Application Priority Data
Aug. 31, 2018 (JP) .................. 2018-163759

(51) Int. Cl.
| | |
|---|---|
| *H01F 27/42* | (2006.01) |
| *H01F 37/00* | (2006.01) |
| *H01F 38/00* | (2006.01) |
| *H02J 50/20* | (2016.01) |
| *H02J 7/02* | (2016.01) |
| *H04B 5/00* | (2006.01) |
| *H02J 50/80* | (2016.01) |

(52) U.S. Cl.
CPC .............. *H02J 50/20* (2016.02); *H02J 7/025* (2013.01); *H02J 50/80* (2016.02); *H04B 5/0037* (2013.01)

(58) Field of Classification Search
CPC . H02J 5/005; H02J 7/025; H02J 17/00; H01F 38/14; B60L 11/182
USPC ......................................................... 307/104
See application file for complete search history.

(56) References Cited

U.S. PATENT DOCUMENTS

| | | | |
|---|---|---|---|
| 2003/0003942 A1* | 1/2003 | Okumura .............. | H04W 52/12 455/522 |
| 2012/0280574 A1 | 11/2012 | Hur et al. | |
| 2014/0339909 A1* | 11/2014 | Sugawara .............. | H02J 7/025 307/104 |

(Continued)

FOREIGN PATENT DOCUMENTS

JP        2019221076 A        12/2019

OTHER PUBLICATIONS

Mitsubishi Heavy Industries, "About Radio Interference Control Technology," METI "The 5th Microwave Wireless Power Transmission Technology Business Development Study Group," Feb. 2018, pp. 1-24.

*Primary Examiner* — Quan Tra
(74) *Attorney, Agent, or Firm* — Holtz, Holtz & Volek PC

(57) ABSTRACT

According to one embodiment, an electronic apparatus includes a signal detector and processor circuitry. The signal detector is configured to detect communication information based on a wireless signal. The processor circuitry is configured to determine at least one of (1) a first period to wait from a timing of when power transmission is ended to a timing of when power transmission is started, (2) a second period to wait from a timing of when the wireless signal is not detected to a timing of when power transmission is started, and (3) a third period for continuously performing power transmission. The processor circuitry is configured to transmit a power with electromagnetic wave according to at least one of the first period, the second period, and the third period.

11 Claims, 7 Drawing Sheets

(56) References Cited

U.S. PATENT DOCUMENTS

| | | | |
|---|---|---|---|
| 2015/0061398 A1* | 3/2015 | Kudo | H04B 5/0031 |
| | | | 307/104 |
| 2016/0087455 A1* | 3/2016 | Tanabe | H02J 5/005 |
| | | | 307/104 |
| 2019/0391620 A1* | 12/2019 | Matsuo | H02J 50/40 |

* cited by examiner

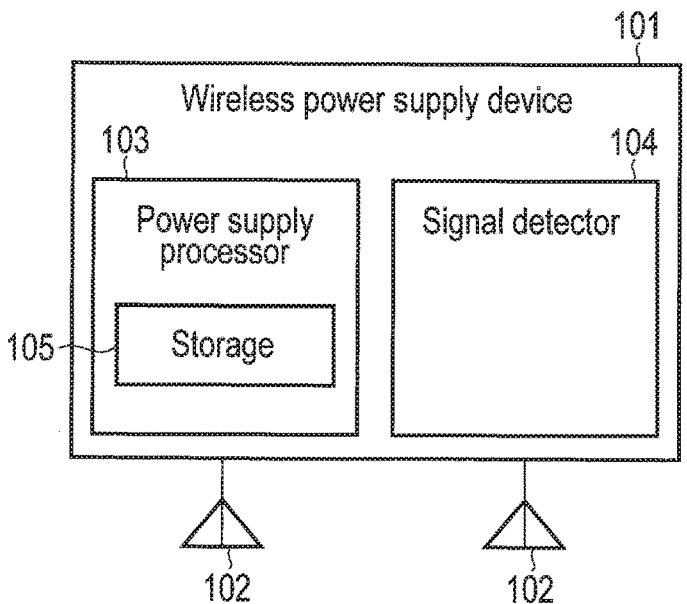
F I G. 1
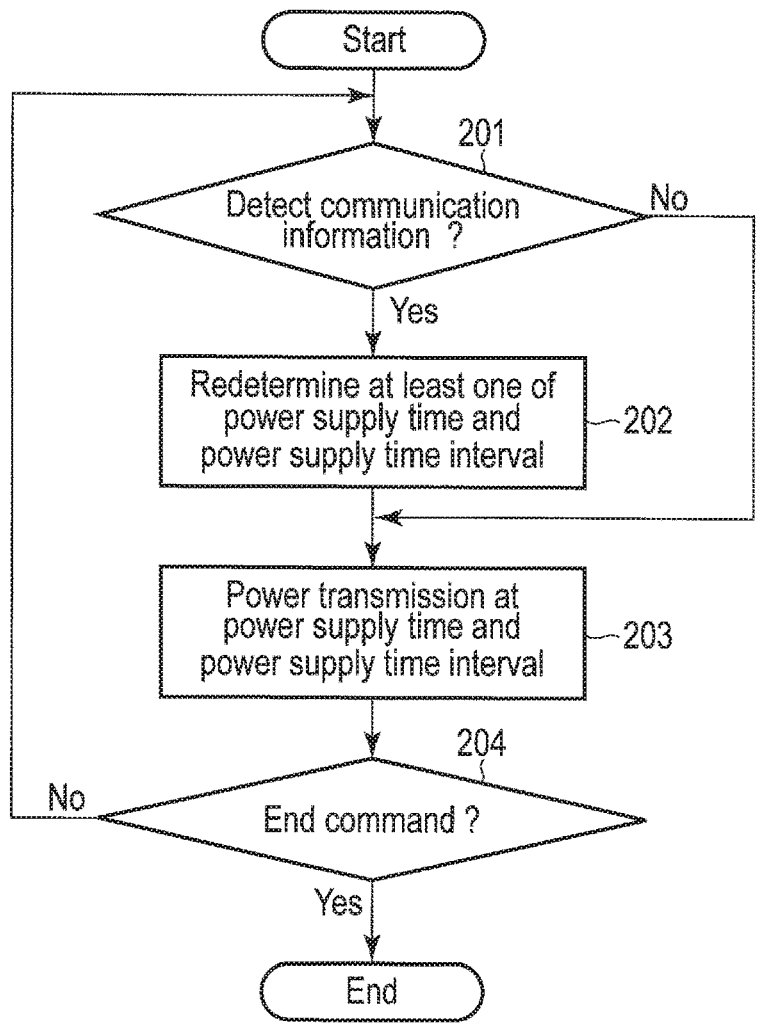
F I G. 2

ELECTRONIC APPARATUS

CROSS-REFERENCE TO RELATED APPLICATIONS

This application is based upon and claims the benefit of priority from Japanese Patent Application No. 2018-163759, filed Aug. 31, 2018, the entire contents of which are incorporated herein by reference.

FIELD

Embodiments described herein relate generally to an electronic apparatus.

BACKGROUND

In recent years, the wireless power supply device performing power transmission using electromagnetic waves is developed. A wireless power supply device performs power transmission using the electromagnetic waves of a specific frequency. This wireless power supply device may give interference to a wireless communication system using a frequency (same frequency band) which is the same as or close to the specific frequency. Therefore, a wireless power supply device and a method capable of coexisting with the wireless communication system using the same frequency band are desired.

BRIEF DESCRIPTION OF THE DRAWINGS

FIG. 1 is a block diagram showing an example of a configuration of a wireless power supply device according to a first embodiment.

FIG. 2 is a flowchart illustrating an example of an operation of the wireless power supply device according to the first embodiment.

DETAILED DESCRIPTION

Figure 3:
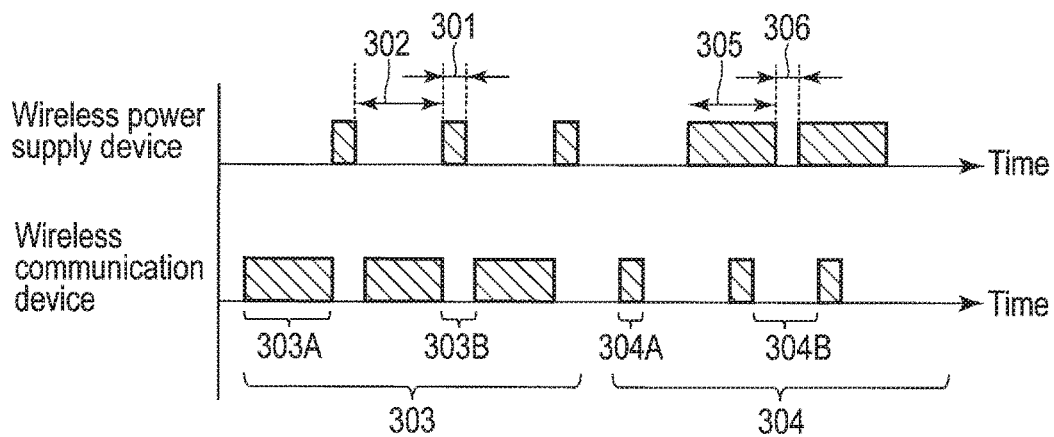
FIG. 3 is a chart showing a time-axis comparison between a communication time of at least one wireless communication device and a power supply time of a wireless power supply device in the first embodiment.

In general, according to one embodiment, an electronic apparatus includes a signal detector and processor circuitry. The signal detector is configured to detect communication information based on a wireless signal transmitted from at least one wireless communication apparatus. The processor circuitry is configured to determine at least one of (1) a first period to wait from a timing of when power transmission is ended to a timing of when power transmission is started, (2) a second period to wait from a timing of when the wireless signal is not detected to a timing of when power transmission is started, and (3) a third period for continuously performing power transmission, based on the communication information. The processor circuitry is configured to transmit a power with electromagnetic wave according to at least one of the first period, the second period, and the third period.

Various embodiments will be described hereinafter with reference to the accompanying drawings.

First Embodiment

FIG. 1 shows a configuration example of a wireless power supply device according to a first embodiment. A wireless power supply device 101 is an electronic apparatus which performs power transmission using electromagnetic waves to an electronic device including a power receiver in a power supply area (not shown). This power receiver indicates a power receiver capable of receiving electromagnetic waves for power transmission and supplying power to an electronic device which incorporates this power receiver. Performing power transmission means hereinafter performing power transmission using electromagnetic waves to an electronic device equipped with the power receiver corresponding to the wireless power supply using electromagnetic waves in a power supply area.

The wireless power supply device 101 includes an antenna 102 including an antenna for detecting a peripheral wireless communication device (wireless communication apparatus) and an antenna for wireless power supply, a power supply processor 103 (a processor circuitry) which performs power transmission, and a signal detector 104 which detects information indicating a communication state (hereinafter referred to as communication information) of at least one peripheral wireless communication device (not shown). The power supply processor 103 includes a storage 105 which stores plural elements of power supply information.

In the present embodiment, the power supply processor 103 performs the power transmission according to plural elements of power supply information of the storage 105, and plural periods relevant to the power transmission are used as the power supply information. As the periods relevant to the power transmission, a time length (third period) for the wireless power supply device to continuously perform the power transmission in one power transmission is called a power supply time. The wireless power supply device may perform the power transmission while taking a rest of a certain period or may continuously perform the power transmission. In addition, as the period relevant to the power transmission, a power supply time interval is a period (first period) to wait from a timing of when the power transmission is ended to a timing of when the power transmission is started. Alternatively, the power supply time interval includes a time from the time when the wireless power supply device activates to the time when the wireless power supply device performs first power transmission.

It is assumed that a wireless communication device using substantially the same frequency band exists on the periphery of the wireless power supply device 101. The wireless power supply device 101 is controlled to perform the power transmission with priority if the communication information is not detected by the signal detector 104, i.e., while communication of the peripheral wireless communication device is not performed.

The signal detector 104 detects the communication information in the power supply area, i.e., a range in which power transmission from the wireless power supply device 101 reaches. The signal detector 104 receives a communication signal (wireless signal) from at least one wireless communication device via the antenna 102. In addition, the signal detector 104 performs at least one of decoding, frequency analysis, received power analysis, and propagation characteristic analysis of the received communication signal, and detects the communication information in the power supply area. The communication information indicates information obtained after the signal detector 104 confirms whether the communication signal exists or not and, if the communication signal exists, receives the communication signal and performs at least one of decoding of the received communication signal, frequency analysis, received power analysis, and propagation characteristic analysis. For example, the communication information is presence of the signal of the wireless communication device, signal energy received at the signal detector 104, a frequency band (hereinafter called a communication frequency band) used for communication by the wireless communication device, time (hereinafter called a communication time) of use of the communication frequency band, a ratio (hereinafter called a use ratio) of the communication time to a whole time in a specific period, the number of wireless communication devices, types of packets, data size, and the like. The communication time includes a time when use of the communication frequency band by the wireless communication device is assured even if communication is not performed. The signal detector 104 holds the communication information for a specific period. The specific period is set by the signal detector 104. The specific period is, for example, a concrete period such as one second.

The power supply processor 103 controls the power transmission using the power supply time and the power supply time interval which are held in the storage 105. The power supply processor 103 holds initial values of the power supply time and the power supply time interval in the storage 105 incorporated in the power supply processor 103. The power supply processor 103 redetermines at least one of the power supply time and the power supply time interval of power transmission with the communication information detected by the signal detector 104, and holds the redetermined period relevant to the power transmission in the storage 105. The power supply processor 103 emits electromagnetic waves of a specific frequency for power supply via the antenna 102 in the determined power supply time and the power supply time interval to perform the power transmission.

FIG. 2 is a flowchart illustrating an example of an operation of the wireless power supply device according to the first embodiment. An operation of the wireless power supply device according to the present embodiment will be explained with reference to FIG. 2. First, the initial value of the power supply time and the initial value of the power supply time interval are set in the storage 105. The signal detector 104 receives the communication signal of at least one wireless communication device via the antenna 102, and performs at least one of decoding, frequency analysis, received power analysis, and propagation characteristic analysis. The signal detector 104 attempts detection of the communication information of the wireless communication device through them (step 201).

If the signal detector 104 cannot detect the communication information of the wireless communication device (step 201: No), the power supply processor 103 performs the power transmission with the initial value of the power supply time and the initial value of the power supply time interval (step 203).

If the signal detector 104 detects the communication information of the wireless communication device (step 201: Yes), the signal detector 104 continues detecting the communication information. The signal detector 104 holds the detected communication information until a specific period. If the signal detector 104 becomes unable to detect the communication information, the power supply processor 103 redetermines at least one of the power supply time and the power supply time interval of the held communication information, and allows the redetermined period relevant to the power transmission to be held (step 202). The redetermination processing may be performed before the signal detector 104 becomes unable to detect the communication information. The power supply processor 103 performs the power transmission at the redetermined power supply time and the redetermined power supply time interval (step 203). As the period relevant to power transmission which is not redetermined in step 202, of the power supply time and the power supply time interval, its initial value held in the storage 105 is used. The period relevant to power transmission which has been redetermined before may be used. The frequency band of the electromagnetic waves for power transmission may be part of the communication frequency band or a frequency band other than the communication frequency band.

If the power transmission is ended, the wireless power supply device 101 confirms whether an end command has arrived from the user (step 204). The wireless power supply device 101 may obtain the end command based on the input from the user, may obtain the end command from the signal including the end command received by the signal detector 104, or may obtain the end command from a human detection sensor which may be incorporated to the wireless power supply device for the purpose of protecting humans from radiated electromagnetic wave. If the end command is not confirmed, the flow returns to step 201 and the signal detector 104 attempts detection of the communication information of at least one wireless communication device. If the end command is confirmed, the flow ends.

FIG. 1 illustrates two antennas 102 but three or more antennas may be provided. The antenna for detection of the wireless communication device and the antenna for wireless power supply may be replaced with a common antenna. In addition, the power supply processor 103, the signal detector 104, and the storage 105 may be mounted on a semiconductor integrated circuit (LSI, etc.) which is physically integrated, mounted on different semiconductor integrated circuits, or partially incorporated similarly to the configuration example of FIG. 1 in which the storage 105 is provided in the power supply processor 103.

The signal detector 104 may limit the frequency band to be detected. The signal detector 104 may not perform decoding of the communication signal, frequency analysis or propagation characteristic analysis, but perform only detection of the signal energy of the wireless communication device. The signal detector 104 may detect part of the communication information. The specific period for the signal detector 104 to hold the communication information may not be a concrete time. For example, the specific period may be a period from the time when the wireless power supply device 101 activates to the current time. The signal detector 104 may urge the storage 105 to hold the communication information.

The power supply processor 103 may determine a Duty ratio which is the ratio of the power supply time to the power supply time interval, based on the communication information detected by the signal detector 104. In addition, if the signal detector 104 cannot detect the communication information (i.e., wireless communication is not performed) as a result of observing the communication frequency band for a specific time, the power supply processor 103 may determine the power supply time interval to sequentially perform the power transmission. In addition, the power supply processor 103 may set an end time. If this end time has passed, the end command is sent to the wireless power supply device 101.

FIG. 3 is a chart showing a time axis of communication of at least one wireless communication device and power transmission performed by the power supply processor 103 of the wireless power supply device 101, as a first example of the first embodiment. The initial value of the power supply time and the initial value of the power supply time interval are set in the storage 105. The signal detector 104 detects the communication time of at least one wireless communication device in the communication frequency band as the communication information. The power supply processor 103 redetermines at least one of the power supply time and the power supply time interval, based on the communication time of the wireless communication device and a time other than the communication time (hereinafter called an out-of-communication time).

In other words, the power supply processor 103 redetermines at least one of the power supply time and the power supply time interval, in response to variation in the communication time. In other words, if the communication time of the peripheral wireless communication device becomes long (i.e., the out-of-communication time becomes short), the power supply processor 103 performs at least one of making the power supply time shorter than ever and making the power supply time interval longer than ever. If the communication time of the wireless communication device becomes short (i.e., the out-of-communication time becomes long), the power supply processor 103 performs at least one of making the power supply time longer than ever and making the power supply time interval shorter than ever.

In section 303 in FIG. 3, for example, communication time 303A of the wireless communication device is longer than out-of-communication time 303B. The power supply processor 103 redetermines power supply time 301 to be shorter than communication time 303A and power supply time interval 302 to be longer than out-of-communication time 303B. In section 304, communication time 304A of the wireless communication device is shorter than out-of-communication time 304B. In this case, the power supply processor 103 redetermines power supply time 305 to be longer than communication time 304A and power supply time interval 306 to be shorter than out-of-communication time 304B.

In addition, the power supply processor 103 may determine the power supply time to be shorter than a specific time and the power supply time interval to be longer than a specific time if the communication time of the peripheral wireless communication device becomes more than a specific threshold value. The power supply processor 103 may redetermine the power supply time to be longer than a specific time and the power supply time interval to be shorter than a specific time if the communication time of the peripheral wireless communication device becomes less than a specific threshold value. The specific threshold value and the specific time are set by the power supply processor 103. The storage 105 holds the specific threshold value and the specific time. Combination of the specific threshold value and the specific time may be plural stepwise. In the example of FIG. 3, both of the power supply time and the power supply time interval are redetermined but either of them may be redetermined.

In addition, the communication information detected by the signal detector 104 may be the number of wireless communication devices in the communication frequency band. The number of wireless communication devices is obtained by decoding the signal of the wireless communication device received by the signal detector 104. The power supply processor 103 redetermines at least one of the power supply time and the power supply time interval, in response to the number of wireless communication devices.

In other words, the power supply processor 103 redetermines at least one of the power supply time and the power supply time interval, in response to the variation in the number of wireless communication devices in the communication frequency band. That is, if the number of wireless communication devices in the communication frequency band increases, the power supply processor 103 performs at least one of making the power supply time shorter than ever and making the power supply time interval longer than ever. If the number of wireless communication devices in the communication frequency band decreases, the power supply processor 103 performs at least one of making the power supply time longer than ever and making the power supply time interval shorter than ever.

For example, the power supply processor 103 redetermines the power supply time to be shorter than a specific time and the power supply time interval to be longer than a specific time if the number of wireless communication devices becomes larger than a specific threshold value. In contrast, the power supply processor 103 redetermines the power supply time to be longer than a specific time and the power supply time interval to be shorter than a specific time if the number of wireless communication devices becomes smaller than a specific threshold value. The specific threshold value and the specific time are set by the power supply processor 103 and held in the storage 105. Combination of the specific threshold value and the specific time may be plural stepwise.

In addition, in the first example of the first embodiment, the redetermination processing is performed after the signal detector 104 stops detecting the signal, but the redetermination processing may be performed before the signal detector 104 stops detecting the signal.

Figure 4:
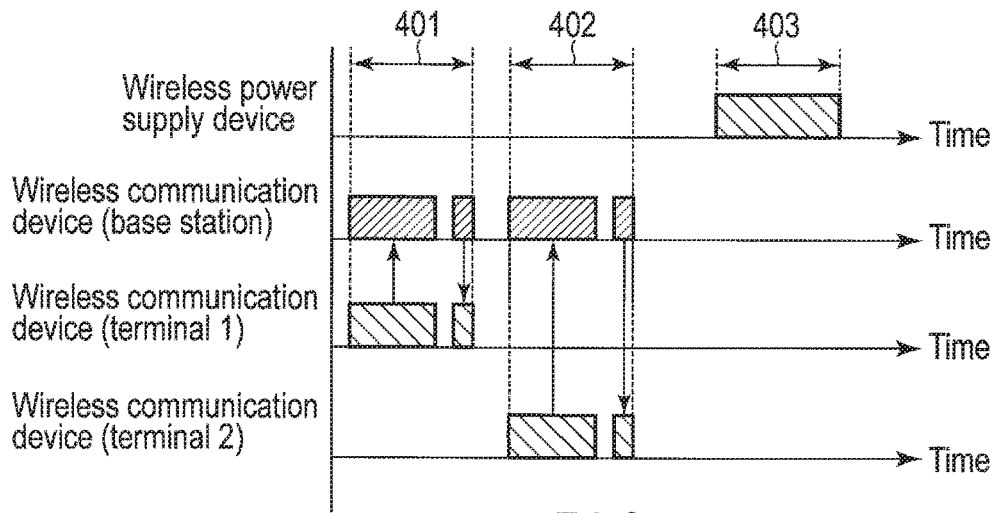
FIG. 4 is a chart showing a time-axis comparison between a communication time of each wireless communication device and a power supply time of a wireless power supply device in the first embodiment.

FIG. 4 is a chart showing a time axis of the communication of each wireless communication device and the power transmission performed by the power supply processor 103 of the wireless power supply device 101, as a second example of the first embodiment. The initial value of the power supply time and the initial value of the power supply time interval are set in the storage 105. The signal detector 104 attempts detection of the communication information of the peripheral wireless communication device, and detects the communication time of each communication as the communication information by performing any one of decoding, frequency analysis, received power analysis, and propagation path analysis for the received signal of the wireless communication device. In other words, the signal detector 104 distinguishes a plurality of communications among the wireless communication devices and detects each communication time. If the signal detector 104 stops detecting the signal, the power supply processor 103 redetermines at least one of the power supply time interval and the power supply time based on each communication time (communication information). The redetermination processing may be performed before the signal detector 104 stops detecting the signal.

For example, the signal detector 104 detects communication time 401 of the wireless communication device (terminal 1) and communication time 402 of the wireless communication device (terminal 2) as the communication information. The signal detector 104 performs signal decoding, frequency analysis, received power analysis, or propagation path analysis and, even if the communication signals are sent from a plurality of wireless communication devices, distinguishes the wireless communication devices. In FIG. 4, communication time 401 of the wireless communication device (terminal 1) and communication time 402 of the wireless communication device (terminal 2) are substantially the same as each other. If communication time 401 and communication time 402 end and the signal detector 104 stops detecting the signal, the power supply processor 103 redetermines power supply time 403 to be equal to or less than communication time 401 and communication time 402.

In the example of FIG. 4, the power supply processor 103 redetermines the power supply time, but may redetermine the power supply time interval, and may redetermine both the power supply time and the power supply time interval. In other words, the power supply processor 103 may redetermine the power supply time interval to be more than or substantially the same as the out-of-communication time of the wireless communication device (terminal 1) or the wireless communication device (terminal 2). The power supply processor 103 may redetermine the power supply time 403 to be less than or substantially the same as the communication time 401 and the communication time 402, and may redetermine the power supply time interval to be more than or substantially the same as the out-of-communication time of the wireless communication device (terminal 1) or the wireless communication device (terminal 2).

In addition, the communication time in each wireless communication device is substantially the same in FIG. 4 but, if the communication time in each wireless communication device differs, the power supply processor 103 may redetermine at least one of the power supply time and the power supply time interval such that the power supply time is less than or equal to the shortest communication time of the communication time in each wireless communication device and that the power supply time interval is more than or equal to the longest out-of-communication time of the out-of-communication time in each wireless communication device. The power supply processor 103 may redetermine at least one of the power supply time and the power supply time interval such that the power supply time is less than or equal to the average communication time of the communication time in each wireless communication device and that the power supply time interval is more than or equal to the average out-of-communication time of the out-of-communication time in each wireless communication device. In addition, the signal detector 104 may detect the signal only when each wireless communication performs data frame communication.

Moreover, FIG. 4 shows two terminals, i.e., terminal 1 and terminal 2 but the operations are the same in a case where one terminal or three or more terminals exist. That is, the signal detector 104 detects wireless communication devices 1 to n (n is a natural number) performing communication in communication times t1 to tn (out-of-communication times T1 to Tn), respectively. If the signal detector 104 stops detecting a signal, the power supply processor 103 redetermines at least one of the power supply time and the power supply time interval such that the power supply time is less than or equal to communication time tk of the wireless communication device k (k is a natural number less than or equal to n) and that the power supply time interval is more than or equal to out-of-communication time Tk of wireless communication device k. In these redeterminations, the power supply processor 103 may redetermine at least one of the power supply time and the power supply time interval such that the power supply time is less than or equal to the minimum communication time of communication times t1 to tn and that the power supply time interval is more than or equal to the maximum out-of-communication time of out-of-communication times T1 to Tn. In addition, the redetermination processing may be performed before the signal detector 104 stops detecting the signal.

As explained above, the signal detector 104 detects the communication time of at least one wireless communication device as communication information, as the first example of the present embodiment. The power supply processor 103 redetermines at least one of the power supply time and the power supply time interval, based on the communication time. Thus, a time ratio at which the communication time of at least one wireless communication device and the power supply time of the wireless power supply device 101 collide can be suppressed to a certain quantity. In addition, when the signal detector 104 detects the number of wireless communication devices in the communication frequency band as the communication information, the power supply processor 103 determines at least one of the power supply time and the power supply time interval, based on the number of wireless communication devices. The number of wireless communication devices which fail in transmission and reception by interference between the wireless power supply device 101 and at least one wireless communication device can be suppressed to a certain quantity.

As a second example of the present embodiment, the signal detector 104 distinguishes the wireless communication devices and detects the communication time of each wireless communication device as the communication information, by performing decoding, frequency analysis, received power analysis, or propagation path analysis for the received signal of the wireless communication device. The power supply processor 103 determines the power supply time, based on the communication time. At this time, the power supply processor 103 determines the power supply time to be less than or equal to the communication of each wireless communication device. The time of interference caused by the power supply of the wireless power supply device 101 thereby remains below the communication time of the wireless communication device, and the wireless power supply device 101 and the wireless communication device can coexist impartially from the viewpoint of time length.

In addition, according to the present embodiment, since the wireless power supply device 101 and at least one wireless communication device do not need to exchange communication signals, the existing wireless communication device and the wireless power supply device 101 can coexist.

Second Embodiment

Figure 5:
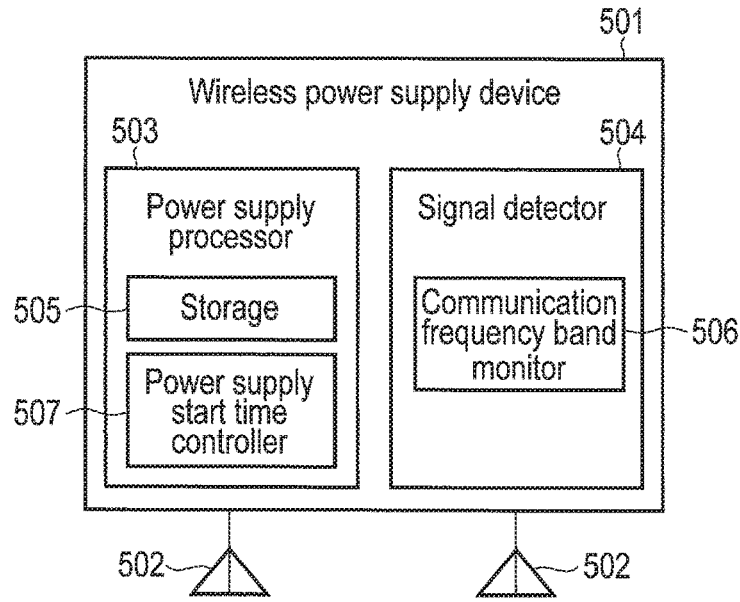
FIG. 5 is a block diagram showing an example of a configuration of a wireless power supply device according to a second embodiment.

FIG. 5 is a block diagram showing a configuration of a wireless power supply device according to a second embodiment. A wireless power supply device 501 also performs power transmission using electromagnetic waves to an electronic device including a power receiver in a power supply area (not shown). As a difference from the first embodiment, a power supply processor of the second embodiment redetermines a standby time elapsing until power supply starts (hereinafter called a standby time interval) as a period relevant to the power transmission. The standby time interval is a period (second period) to wait from a timing of when a wireless signal (communication information) is not detected to a timing of when power transmission is started. In addition, a signal detector of the second embodiment monitors the condition of use of the communication frequency band.

The wireless power supply device 501 includes an antenna 502 including an antenna for detecting a wireless communication device and an antenna for wireless power supply, a power supply processor 503 which performs power transmission, and a signal detector 504 which detects communication information of at least one wireless communication device (not shown). The power supply processor 503 includes a power supply start time controller 507 which redetermines a standby time interval together with a storage 505 for storing plural elements of power supply information. In addition, the signal detector 504 includes a communication frequency band monitor 506 which monitors the conditions of use of one or more communication frequency bands.

In the present embodiment, the power supply processor 503 performs the power transmission according to plural elements of power supply information of the storage 505, and a period relevant to the power transmission is used here. As the periods relevant to the power transmission, a time length for the wireless power supply device to sequentially perform the power transmission in one power transmission is called a power supply time. The wireless power supply device may perform the power transmission while taking a rest for a certain period or may continuously perform the power transmission. In addition, as the period relevant to the power transmission, the standby time interval is a time interval from the time when the wireless power supply device determines that communication of the other wireless communication device is not performed to the time when the power supply starts.

It is assumed that a wireless communication device using substantially the same frequency band exists on the periphery of the wireless power supply device 501. The wireless power supply device 501 is controlled to stand by for a certain time, too, if the communication information is not detected by the signal detector 504, i.e., while communication of the other wireless communication device is not performed, and to perform the power transmission if the communication information is not detected for the period.

The power supply processor 503 controls the power transmission using the power supply time and the standby time interval which are held in the storage 505. Initial values of the power supply time and the power supply time interval are held in the storage 505 incorporated in the power supply processor 503 and the power supply processor 503 can redetermine the power supply time based on the communication information, similarly to the power supply processor 103 of the first embodiment. In addition, the power supply processor 503 can also redetermine the standby time interval, based on the condition of use of the communication frequency band, via the power supply start time controller 507 incorporated in the power supply processor 503. That is, the power supply processor 503 can redetermine at least one of the power supply time and the standby time interval in power transmission. The power supply processor 503 urges the storage 505 to hold the redetermined power supply time and the redetermined standby time interval, and performs power transmission with the determined power supply time and the determined standby time interval.

The signal detector 504 receives a communication signal from at least one wireless communication device via the antenna 502, similarly to the signal detector 104 of the first embodiment. In addition, the signal detector 504 performs at least one of decoding, frequency analysis, received power analysis, and propagation characteristic analysis for the received communication signal. The signal detector 504 receives the communication information of at least one wireless communication device through them.

The communication frequency band monitor 506 notifies the power supply processor 503 and the power supply start time controller 507 of the conditions of use of one or more communication frequency bands, based on the communication information detected by the signal detector 504. That is, the communication frequency band monitor 506 notifies the power supply processor 503 and the power supply start time controller 507 of a state (hereinafter called idle) in which the communication frequency band is not used or a state (hereinafter called busy) in which the communication frequency band is used.

The power supply start time controller 507 redetermines the standby time interval, based on the communication information detected by the signal detector 504, and notifies the power supply processor 503 of the standby time interval.

Figure 6:
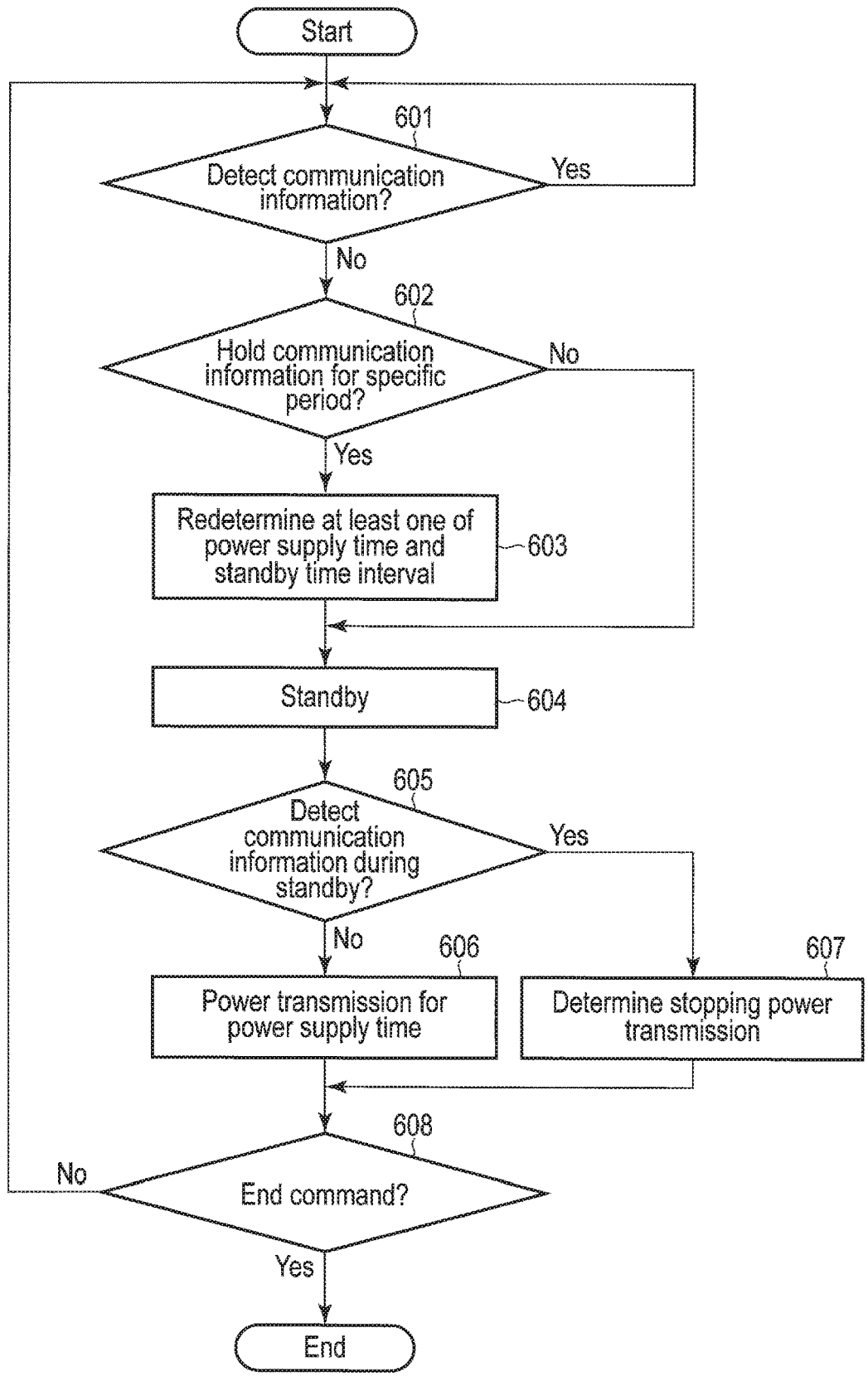
FIG. 6 is a flowchart illustrating an example of an operation of the wireless power supply device according to the second embodiment.

FIG. 6 is a flowchart illustrating an example of an operation of the wireless power supply device according to the second embodiment. An operation of the wireless power supply device according to the present embodiment will be explained with reference to FIG. 6. First, the initial value of the power supply time and the initial value of the standby time interval are set in the storage 505. The signal detector 504 receives the communication signal of at least one wireless communication device via the antenna 502, and performs at least one of decoding, frequency analysis, received power analysis, and propagation characteristic analysis. The signal detector 504 attempts detection of the communication information of the wireless communication device through them (step 601).

If the signal detector 504 detects the communication information (step 601: Yes), the signal detector 504 holds the communication information until a specific period. The signal detector 504 may urge the storage 505 to hold the detected communication information. The communication frequency band monitor 506 notifies the power supply processor 503 and the power supply start time controller 507 that the communication frequency band in which the communication information has been detected is busy. Then, the flow returns to step 601 again.

If the signal detector 504 does not detect the communication information (step 601: No), the communication frequency band monitor 506 notifies the power supply processor 503 and the power supply start time controller 507 that the communication frequency band is idle. Next, the power supply processor 503 confirms whether the signal detector 504 holds the communication information (step 602). The power supply processor 503 may confirm whether the storage 505 holds the communication information.

If the signal detector 504 or the storage 505 holds the communication information (step 602: Yes), at least one of the redetermination of the power supply time performed by the power supply processor 503 and the redetermination of the standby interval time performed by the power supply start time controller 507 is performed, based on the communication information (step 603). If the standby time interval is redetermined, the power supply start time controller 507 notifies the power supply processor 503 of the standby time interval. The power supply processor 503 holds the redetermined period relevant to the power transmission in the storage 505. The redetermination processing may be performed before the signal detector 504 becomes unable to detect the communication information.

If the signal detector 504 or the storage 505 does not hold the communication information (step 602: No), redetermination of the power supply time or the standby time interval is not performed.

Next, the power supply processor 503 does not perform the power supply immediately but stands by for the standby interval time (step 604). The standby time interval is used if the standby time interval is redetermined, and the initial value stored in the storage 505 is used if the standby time interval is not redetermined. The standby time interval redetermined before may be used. The signal detector 504 attempts detection of the communication information of the wireless communication device during standby of the power supply processor 503, too (step 605). If the signal detector 504 detects the communication information during standby of the power supply processor 503 (step 605: Yes), the signal detector 504 holds the communication information until a specific period. The signal detector 504 may urge the storage 505 to hold the detected communication information. The communication frequency band monitor 506 notifies the power supply processor 503 that the communication frequency band in which the communication information has been detected is busy. The power supply processor 503 determines that the power transmission is not performed even after standing by for the standby interval time (step 607).

In contrast, if the signal detector 504 does not detect the communication information during standby of the power supply processor 503 (step 605: No), the communication frequency band monitor 506 notifies the power supply processor 503 that the communication frequency band in which the communication information has been detected is idle. The power supply processor 503 performs the power transmission for the power supply time (step 606). The power supply time is used if the power supply time is redetermined, and the initial value stored in the storage 505 is used if the power supply time is not redetermined. The power supply time redetermined before may be used. The frequency band of the electromagnetic waves for power transmission may be part of the communication frequency band or a frequency band other than the communication frequency band.

Subsequently with steps 606 and 607, the wireless power supply device 501 confirms whether an end command has arrived from the user (step 608). The wireless power supply device 501 may obtain the end command based on the input from the user, may obtain the end command from the signal including the end command received by the signal detector 504, or may obtain the end command from a human detection sensor which may be incorporated to the wireless power supply device for the purpose of protecting humans from radiated electromagnetic wave. If the end command is not confirmed, the flow returns to step 601 and the signal detector 504 attempts detection of the communication information of at least one wireless communication device. If the end command is confirmed, the flow ends.

The variation of the configuration can be variously modified similarly to the first embodiment. The configuration shown in FIG. 5 is a mere example, and the component elements may be mounted on a semiconductor integrated circuit (LSI, etc.) which is physically integrated, mounted on different semiconductor integrated circuits, or partially incorporated similarly to the configuration example of FIG. 5 in which the power supply start time controller 507 is provided in the power supply processor 503.

If the signal detector 504 cannot detect the communication information (i.e., wireless communication is not performed) as a result of observing the communication frequency band for a specific time, the power supply start time controller 507 may redetermine the standby time interval such that the power supply processor 503 sequentially performs the power transmission. In addition, the power supply processor 503 may set an end time. If this end time has passed, the end command is sent to the wireless power supply device 501.

Figure 7:
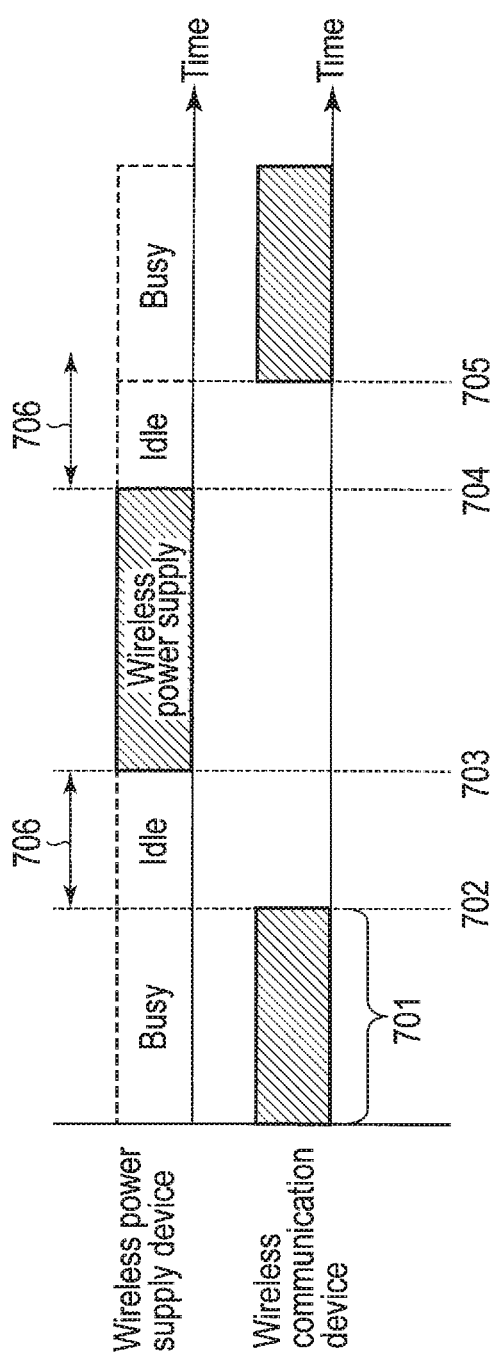
FIG. 7 is a chart showing a time-axis comparison between a communication time of at least one wireless communication device and a power supply time of a wireless power supply device in the second embodiment.

FIG. 7 is a chart showing a time axis of a communication time of at least one wireless communication device and a power supply time of a wireless power supply device as a first example of the second embodiment. The initial value of the power supply time and the initial value of the standby time interval are set in the storage 505. The signal detector 504 attempts detection of the communication information of at least one wireless communication device.

If the communication frequency band is busy, the signal detector 504 holds the communication information for a specific period and continues the detection of the communication information. If the communication frequency band is idle and if the communication information exists in the signal detector 504, at least one of the standby time interval of the power supply start time controller 507 and the power supply time of the power supply processor 503 is redetermined. The power supply processor 503 urges the storage 505 to hold the redetermined period relevant to the power transmission. In contrast, if the communication information does not exist in the signal detector 504, redetermination of the standby time interval and power supply time is not performed.

Even if the communication frequency band is idle, the power supply processor 503 does not immediately perform power transmission but stands by for the standby time interval. If the communication frequency band becomes busy during standby of the power supply processor 503, the signal detector 504 holds the communication information for a specific period and attempts the detection of the communication information. The power supply processor 503 does not perform power transmission even after ending standby.

If the communication frequency band is also idle during standby of the power supply processor 503, the power supply processor 503 performs power transmission for the power supply time after ending standby.

For example, in the wireless power supply device 501 in which the initial value of the power supply time and the initial value of the power supply time interval are set in the storage 505, the signal detector 504 can detect the communication information of the wireless communication device, in section 701. The communication frequency band monitor 506 notifies the communication frequency band monitor 507 and the power supply processor 503 that the communication frequency band used by the wireless communication device is busy. The signal detector 504 continues detecting the communication information of the wireless communication device while holding the detected communication information for a specific period. The signal detector 504 may urge the storage 505 to hold the detected communication information.

The signal detector 504 becomes unable to detect the communication information of the wireless communication device, at time 702. The communication frequency band monitor 506 notifies the power supply start time controller 507 and the power supply processor 503 that the communication frequency band is idle. The power supply start time controller 507 redetermines the standby interval time 706, based on the communication information detected by the signal detector 504, and notifies the power supply processor 503 of the standby interval time. The power supply processor 503 redetermines the power supply time (between time 703 and time 704), based on the communication information stored in the signal detector 504. The power supply processor 503 holds the redetermined standby time interval 706 and the redetermined power transmission time (between time 703 and time 704) in the storage 505.

After that, the power supply processor 503 stands by for the standby time interval. When the communication frequency band monitor 506 notifies the power supply processor 503 that the communication frequency band is continuously idle, during the standby time interval 706, the power supply processor 503 starts power supply after the standby time interval 706 has passed (time 703). The power supply processor 503 stops power transmission at time 704 after performing power transmission for the power supply time (between time 703 and time 704).

If the end command does not exist in the wireless power supply device 501, the communication frequency band becomes idle again, and the communication frequency band monitor 506 thereby notifies the power supply processor 503 and the power supply start time controller 507 that the communication frequency band is idle. The power supply start time controller 507 redetermines the standby interval time 706 and notifies the power supply processor 503 of the standby interval time. The power supply processor 503 redetermines the power supply time, based on the communication information, and holds the redetermined period relevant to the power transmission in the storage 505. After that, the power supply processor 503 stands by for the standby interval time 706.

Since the wireless communication device starts using the communication frequency band at time 705 at which the power supply processor 503 is standing by, the communication frequency band monitor 506 notifies the power supply processor 503 that the communication frequency band is busy. The power supply processor 503 determines that power transmission is not performed even after standby.

In FIG. 7, both of the power supply time and the power supply time interval are redetermined but either of them may be redetermined. In addition, redetermination of the power supply time and redetermination of the standby time interval are performed after the communication frequency band becomes idle, but these redeterminations may be performed while the communication frequency band is busy.

Figure 8:
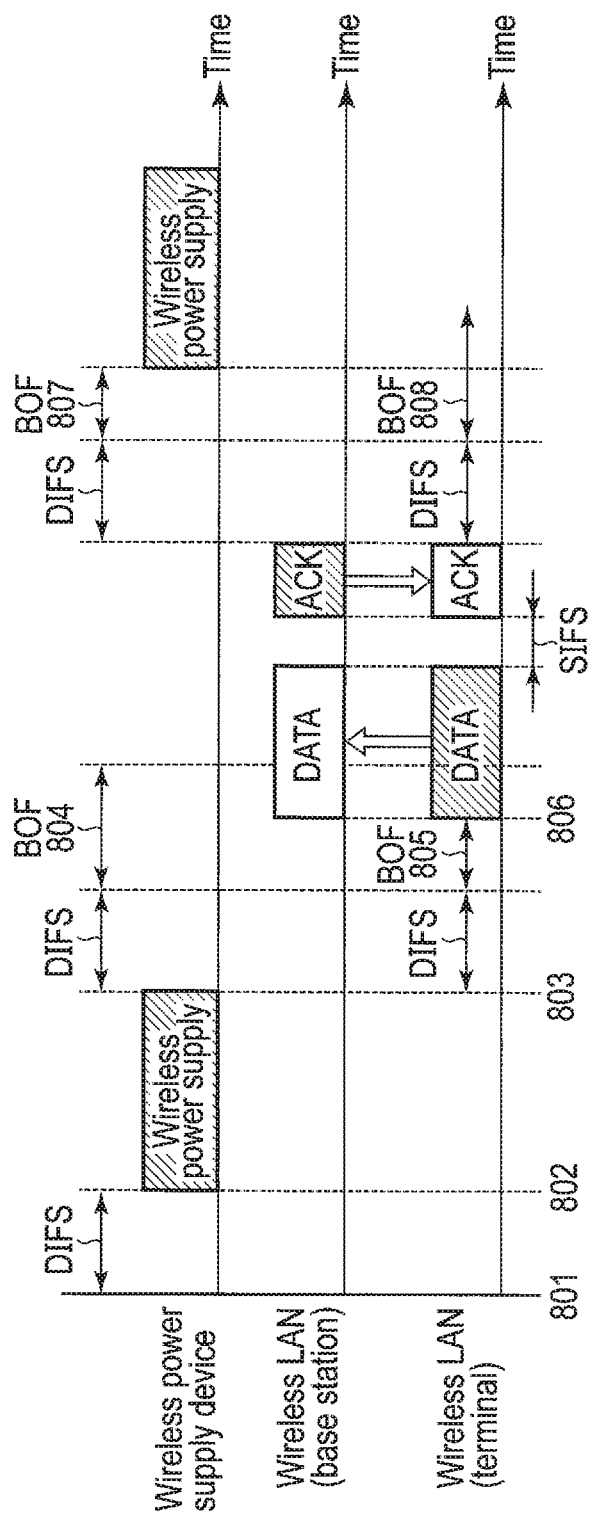
FIG. 8 is a chart showing a time-axis comparison between a communication time of a LAN device and a power supply time of a wireless power supply device in the second embodiment.

FIG. 8 is a chart showing a time axis comparison between the communication time of the LAN device and the power supply time of the wireless power supply device 501 performing power supply in CSMA/CA, as the second example of the second embodiment.

In wireless LAN, DCF Inter Frame Space (DIFS) time is defined as the standby time before connection to the communication frequency band. The wireless LAN device stands by for DIFS and then connects to the communication frequency band if the communication frequency band is idle. In contrast, if the communication frequency band is busy, the wireless LAN device stands by for the time obtained by adding Backoff (BOF) to DIFS after detecting the change of the status from busy to idle. The length of BOF is determined by a parameter called Contention Window (CW). In other words, the length of BOF is determined in accordance with a random number generated within a range of CW. If the communication frequency band is idle while the wireless LAN device stands by for DIFS+BOF, the wireless LAN device connects to the communication frequency band. If the communication frequency band becomes busy while the wireless LAN device stands by for DIFS+BOF, the wireless LAN device does not make connection to the communication frequency band even after ending standby for DIFS+BOF. The method of connection to the communication frequency band is called Carrier Sense Multiple Access with Collision Avoidance (CSMA/CA).

In this example, the wireless power supply device 501 performs the power transmission in CSMA/CA. Since the wireless communication device performs communication using wireless LAN, the wireless communication device is called a wireless LAN terminal. The standby time interval and the power supply time of the wireless power supply device 501 are set to the initial values in the storage 505, and DIFS is set as the initial value of the standby time interval. First, the signal detector 504 attempts detection of the communication information of at least one wireless LAN terminal.

In a case where the communication frequency band is idle, if the signal detector 504 holds the communication information, at least one of the standby time interval of the power supply start time controller 507 and the power supply time of the power supply processor 503 is redetermined. If the communication information does not exist in the signal detector 504, redetermination of the power supply time and standby time interval is not performed. The power supply processor 503 does not immediately perform power transmission but stands by for DIFS. If the communication frequency band becomes busy during standby of the power supply processor 503, the power supply processor 503 does not perform power transmission even after standby. If the communication frequency band is also idle during standby of the power supply processor 503, the power supply processor 503 performs power transmission for the power supply time after ending standby.

In contrast, if the communication frequency band is busy, the signal detector 504 holds the communication information in the storage 505 for a specific period and continues detecting the communication information. If the status of the communication frequency band is changed from busy to idle, the power supply start time controller 507 redetermines the standby time interval to DIFS+BOF. The power supply processor 503 may redetermine the power supply time, based on the communication information. The power supply processor 503 does not immediately perform power transmission but stands by for DIFS+BOF. If the communication frequency band becomes busy during standby of the power supply processor 503, the power supply processor 503 does not perform power transmission even after ending standby. If the communication frequency band is also idle during standby of the power supply processor 503, the power supply processor 503 performs power transmission for the power supply time after ending standby.

For example, the wireless power supply device 501 determines the initial value of the power supply time and determines DIFS as the initial value of the standby time interval, in the storage 505. At time 801 in FIG. 8, the signal detector 504 cannot detect the communication information. The communication frequency band monitor 506 notifies the power supply processor 503 and the power supply start time controller 507 that the communication frequency band is idle. Since the signal detector 504 does not still detect the communication information, redetermination of the power supply time and standby time interval is not performed. The power supply processor 503 does not immediately start power transmission but stands by for DIFS.

If the communication frequency band monitor 506 notifies the power supply processor 503 that the communication frequency band is continuously idle, during DIFS, the power supply processor 503 starts power supply after the standby time interval has passed (time 802). If the power supply processor 503 stops power transmission at time 803 after performing power transmission for the power supply time (between time 802 and time 803), the communication frequency band is changed from busy to idle. The power supply start time controller 507 redetermines DIFS+BOF 804 as the standby interval time and notifies the power supply processor 503 of the redetermined standby interval time.

The wireless LAN terminal which requests connection to the communication frequency band stands by for DIFS+BOF 805, at time 803 when the communication frequency band is changed from busy to idle. Since BOF 805 of the wireless LAN terminal is smaller than BOF 804 of the wireless power supply device 501, the wireless LAN terminal can make connection to the communication frequency band. The wireless LAN terminal starts transmission of data packets at time 806. After time 806, the signal detector 504 detects the communication information of the wireless LAN terminal, holds the communication information in the storage 505 for a specific period, and continues the detection. The communication frequency band monitor 506 notifies the power supply processor 503 that the communication frequency band is busy. The power supply processor 503 which has received this notification determines that the power transmission is not performed even after standing by for DIFS+BOF 804, which is the standby time interval.

The wireless LAN base station which has received the data packets returns acknowledgment packets (ACK) after SIFS time. Since SIFS is defined as a time interval shorter than DIFS under wireless LAN standards, connection of the wireless LAN terminal and the wireless LAN base station to the communication frequency band is assured until sending and receiving the acknowledgment packets are completed. After sending and receiving the response packets have been completed, the status of the communication frequency band is changed from busy to idle. Since the signal detector 504 becomes unable to detect the communication information, the communication frequency band monitor 506 notifies the power supply start time controller 507 and the power supply processor 503 that the communication frequency band is idle. The power supply start time controller 507 redetermines the time obtained by adding BOF 807 to DIFS as the standby time interval, similarly to the example explained above, and notifies the power supply processor 503 of the time. Since the communication information is detected by the signal detector 504, the power supply processor 503 redetermines the power supply time, based on the communication information, and urges the storage 505 to hold the redetermined period relevant to the power transmission. After that, the power supply processor 503 stands by for DIFS+BOF 807. The wireless LAN terminal determines the time obtained by adding BOF 808 to DIFS and starts standby, similarly to the previously explained operation. Since BOF 807 of the wireless power supply device 501 is shorter than BOF 808 of the wireless LAN terminal, the power supply processor 503 starts power supply next time.

Thus, every time the status of the communication frequency band is changed from busy to idle, the wireless power supply device 501 and the wireless LAN terminal stand by for the time obtained by adding BOF to DIFS as the random value. Power supply is performed if the wireless power supply device 501 ends standby earlier, and communication is performed in the communication frequency band if the wireless LAN terminal ends standby earlier.

In FIG. 8, both of the standby time interval and the power supply time are redetermined, but the standby time interval alone may be redetermined. In addition, redetermination of the power supply time and redetermination of the standby time interval are performed after the communication frequency band becomes idle, but these redeterminations may be performed while the communication frequency band is busy.

In addition, in FIG. 8, a pair of the wireless LAN terminal and the wireless LAN base station are provided, but a plurality of wireless LAN terminals and wireless LAN base stations may be provided. In this case, too, the operation is the same as the second example of the second embodiment. The wireless power supply device 501 holds the initial value of the power supply time and holds DIFS as the initial value of the standby time interval, in the storage 505.

If the signal detector 504 cannot detect the communication information, the communication frequency band monitor 506 notifies the power supply processor 503 and the power supply start time controller 507 that the communication frequency band is idle. If the signal detector 504 holds the communication information, at least one of the standby time interval redetermination by the power supply start time controller 507 and the supply time redetermination by the power supply processor 503 is performed. The redetermined period relevant to the power transmission is held in the storage 505. In contrast, if the signal detector 504 does not hold the communication information, the power supply processor 503 does not perform redetermination of the power supply time. After that, the power supply processor 503 does not immediately perform power transmission but stands by for DIFS.

If the communication frequency band monitor 506 notifies the power supply processor 503 that the communication frequency band is continuously idle during DIFS, the power supply processor 503 starts power supply after DIFS has passed. If the communication frequency band monitor 506 notifies the power supply processor 503 that the communication frequency band is busy during DIFS, the power supply processor 503 determines that power transmission is not performed even after ending standby for DIFS.

In contrast, if the signal detector 504 can detect the communication information, the communication frequency band monitor 506 notifies the power supply processor 503 and the power supply start time controller 507 that the communication frequency band is busy. The signal detector 504 holds the communication information for a specific period. The storage 505 may hold the communication information. After that, the signal detector 504 continues detecting the communication information.

If the signal detector 504 becomes unable to detect the communication information, the communication frequency band monitor 506 notifies the power supply processor 503 and the power supply start time controller 507 that the communication frequency band is idle. The power supply start time controller 507 redetermines the time obtained by adding BOF to DIFS as the standby time interval, and notifies the power supply processor 503 of the time. The power supply processor 503 redetermines the power supply time, based on the communication information, urges the storage 505 to hold the redetermined period relevant to the power transmission, and starts standby. A plurality of wireless LAN terminals also determine the time obtained by adding BOF to DIFS and start standby. If the device first ending standby is a wireless LAN terminal, the communication is performed in the communication frequency band. The communication frequency band monitor 506 notifies the power supply processor 503 that the communication frequency band is busy. The power supply processor 503 determines that power transmission is not performed even if standby is ended. If the device first ending standby is the wireless power supply device 501, power supply is performed.

Figure 9:
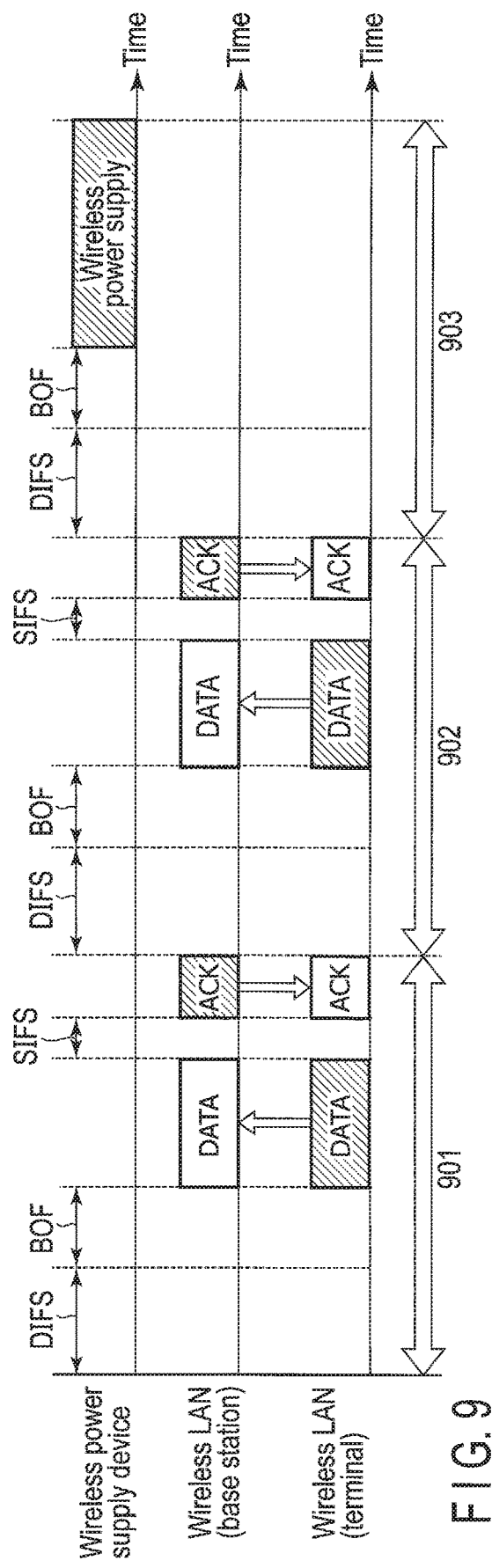
FIG. 9 is a chart showing a time-axis comparison between a communication cycle of a LAN device and a power supply time of a wireless power supply device in the second embodiment.

FIG. 9 is a chart showing a time-axis comparison between the wireless power supply device and the wireless LAN terminal in a case where a total of the standby time (DIFS+BOF+SIFS) for the wireless LAN terminal to connect to the communication frequency band and the time (data packet send time+ACK packet receive time) for the wireless LAN terminal to use this communication frequency band is substantially equal to a total of the power supply time and the standby time interval (DIFS+BOF) of the wireless power supply device, as a third example of the second embodiment. The power supply processor 503 redetermines the power supply time by considering the time which the wireless LAN terminal spends for communication as the communication information.

A general communication flow of the wireless LAN terminal is shown below. When the status of the communication frequency band is changed from busy to idle, the wireless LAN terminal stands by for DIFS+BOF. Next, the wireless LAN terminal ending standby sends the data packets to the wireless LAN base station. Next, the wireless LAN terminal stands by for SIFS. Finally, the wireless LAN terminal receives the ACK packets from the wireless LAN base station. In other words, the time required for the wireless LAN terminal to perform this communication flow is the total of DIFS, BOF, the data packet send time, SIFS, and ACK packet receive time (hereinafter called a communication cycle). The communication cycle of the wireless LAN is substantially similar though it is varied with respect to the length of BOF, packet type, data size, and the like. The signal detector 504 detects at least one wireless LAN terminal communication cycle as the communication information. The power supply processor 503 redetermines the power supply time such that the sum of the standby time interval and the power supply time is less than or equal to the detected communication cycle.

For example, the signal detector 504 detects communication cycles 901 and 902 of the wireless LAN terminal as the communication information, and holds the communication information for a specific period. The signal detector 504 may hold the communication cycles in the storage 505. When the wireless LAN ends communication, the status of the communication frequency band is changed from busy to idle. The communication frequency band monitor 506 notifies the power supply processor 503 and the power supply start time controller 507 that the communication frequency band is idle.

The power supply start time controller 507 redetermines the time obtained by adding BOF to DIFS as the standby time interval, and notifies the power supply processor 503 of the time. Since the communication cycles 901 and 902 are similar in FIG. 9, the power supply processor 503 redetermines the power supply time such that the sum 903 of the standby time interval and the power supply time is similar to the communication cycles 901 and 902. The power supply processor 503 holds the redetermined period relevant to the power transmission in the storage 505, and starts standby for the redetermined standby time interval. The power supply processor 503 may redetermine the power supply time such that the sum 903 of the standby time interval and the power supply time is less than or equal to the communication cycles 901 and 902.

After that, if the communication frequency band monitor 506 notifies the power supply processor 503 that the communication frequency band is continuously idle during the standby time interval, the power supply processor 503 starts power supply after the standby time interval has passed. If the communication frequency band monitor 506 notifies the power supply processor 503 that the communication frequency band is busy during the standby time interval, the power supply processor 503 determines that power transmission is not performed even after ending standby.

A plurality of variations of the communication cycle are considered. If the signal detector 504 detects a plurality of different communication cycles, the signal detector 503 may use the shortest communication cycle, the longest communication cycle, or an averaged communication cycle, of a plurality of communication cycles detected by the signal detector 504, as the communication cycle used for redetermination of the power supply time. A method of determining the communication cycle irrespective of the communication information detected by the signal detector 504 may also be considered. The power supply processor 503 may use a communication cycle in a case where the wireless LAN terminal sends the maximum data size defined under the wireless communication standards, a communication cycle in a case where the wireless LAN terminal sends the minimum data size defined under the wireless communication standards, or a communication cycle in a case where the wireless LAN terminal sends the average data size of the wireless communication, as the communication cycle used for redetermination of the power supply time.

In addition, redetermination of the power supply time and redetermination of the standby time interval are performed after the communication frequency band becomes idle, but these redeterminations may be performed while the communication frequency band is busy.

As described above, in the first example of the present embodiment, first, the power supply time interval and the power supply time of the wireless power supply device 501 are set to the initial values, respectively, in the storage 505.

The signal detector 504 attempts detection of the communication information of the wireless communication device. If the signal detector 504 detects the communication information, the signal detector 504 holds the communication information until a specific period and continues the detection. The communication frequency band monitor 506 notifies the power supply processor 503 and the power supply start time controller 507 that the communication frequency band in which the communication information has been detected is busy.

If the signal detector 504 does not detect the communication information, the communication frequency band monitor 506 notifies the power supply processor 503 and the power supply start time controller 507 that the communication frequency band is idle. If the communication information for a specific period is held in the signal detector 504, at least one of the redetermination of the power supply time performed by the power supply processor 503 and the redetermination of the standby interval time performed by the power supply start time controller 507 is performed, based on the communication information. The power supply processor 503 holds the redetermined period relevant to the power transmission in the storage 505, does not perform power supply immediately, but stands by for the standby interval time.

The signal detector 503 attempts detection of the communication information of the wireless communication device during standby of the power supply processor 503, too. If the signal detector 504 detects the communication information during standby of the power supply processor 503, the signal detector 504 holds the communication information until a specific period and continues the detection. The communication frequency band monitor 506 notifies the power supply processor 503 that the communication frequency band in which the communication information has been detected is busy. The power supply processor 503 determines that the power transmission is not performed even after standing by for the standby interval time.

If the signal detector 504 does not detect the communication information during standby of the power supply processor 503, the communication frequency band monitor 506 notifies the power supply processor 503 that the communication frequency band in which the communication information has been detected is idle. The power supply processor 503 performs the power transmission for the power supply time after ending standby. Thus, interference between the wireless power supply device 501 and the wireless communication device can hardly occur.

In the second example of the present embodiment, the wireless power supply device 501 performs the power transmission in CSMA/CA in wireless LAN. The standby time interval and the power supply time of the wireless power supply device 501 are set to the initial values, respectively, in the storage 505, and the initial value of the standby time interval is DIFS. The signal detector 504 attempts detection of the communication information of the wireless communication device.

If the signal detector 504 cannot detect the communication information, the communication frequency band monitor 506 notifies the power supply processor 503 and the power supply start time controller 507 that the communication frequency band is idle. The power supply processor 503 does not immediately perform power transmission but stands by for DIFS. If the communication frequency band monitor 506 notifies the power supply processor 503 that the signal detector 504 does not continue detecting the communication information for DIFS and that the communication frequency band is idle, the power supply processor 503 starts power supply after DIFS has passed. In contrast, if the signal detector 504 detects the communication information during DIFS, the signal detector 504 holds the communication information until a specific period and continues the detection. The communication frequency band monitor 506 notifies the power supply processor 503 that the communication frequency band is busy. The power supply processor 503 determines that the power transmission is not performed even if standby is ended for DIFS.

If the signal detector 504 can detect the communication information, the communication frequency band monitor 506 notifies the power supply processor 503 and the power supply start time controller 507 that the communication frequency band is busy. The signal detector 504 holds the detected communication information for a specific period and continues detecting the communication information.

If the signal detector 504 becomes unable to detect the communication information, the communication frequency band monitor 506 notifies the power supply processor 503 and the power supply start time controller 507 that the communication frequency band is idle. The power supply start time controller 507 redetermines the time obtained by adding BOF to DIFS as the standby time interval, and notifies the power supply processor 503 of the time. The power supply processor 503 redetermines the power supply time, based on the communication information, urges the storage 505 to hold the redetermined period relevant to the power transmission, and starts standby for the standby time interval. The wireless LAN terminal also determines the time obtained by adding BOF to DIFS and starts standby.

If the device previously ending standby is a wireless LAN terminal, the communication is performed in the communication frequency band. The signal detector 504 detects the communication information of the wireless LAN terminal, and continues the detection while holding the communication information for a specific period. The communication frequency band monitor 506 notifies the power supply processor 503 that the communication frequency band is busy. The power supply processor 503 determines that power transmission is not performed even if standby is ended. If the device first ending standby is the wireless power supply device 501, power supply is performed. Thus, impartial coexistence of the wireless power supply device and the wireless LAN terminal can be implemented from the viewpoint of an opportunity of connection to the communication frequency band.

In the third example of the present embodiment, the signal detector 504 detects the communication cycle of the wireless LAN terminal which is performing communication device as communication information. When the wireless LAN ends communication, the status of the communication frequency band is changed from busy to idle. The communication frequency band monitor 506 notifies the power supply processor 503 and the power supply start time controller 507 that the communication frequency band is idle. The power supply start time controller 507 redetermines the time obtained by adding BOF to DIFS as the standby time interval, and notifies the power supply processor 503 of the time. The power supply processor 503 redetermines the sum of the standby time interval and the power supply time to be less than or equal to the communication cycle, holds the redetermined period relevant to the power transmission in the storage 505, and starts standby for the standby time interval.

If the communication frequency band monitor 506 notifies the power supply processor 503 that the communication frequency band is continuously idle during the standby time interval, the power supply processor 503 starts power supply after the standby time interval has passed. In contrast, if the signal detector 504 detects the communication information during the standby time interval, the signal detector 504 holds the communication information until a specific period and continues the detection. The communication frequency band monitor 506 notifies the power supply processor 503 that the communication frequency band is busy during the standby time interval, and the power supply processor 503 determines that power transmission is not performed even after ending standby. Thus, impartial coexistence of the wireless power supply device and the wireless LAN terminal can be implemented from the viewpoint of the time to use the communication frequency band.

In addition, according to the present embodiment, since the wireless power supply device and at least one wireless communication device do not need to exchange communication signals, the existing wireless communication device and the wireless power supply device can coexist.

Third Embodiment

Figure 10:
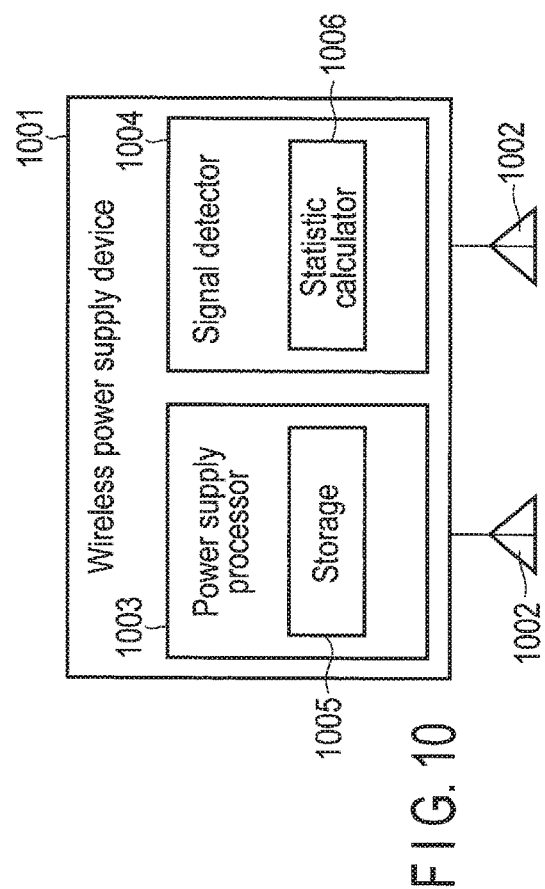
FIG. 10 is a block diagram showing an example of a configuration of a wireless power supply device according to a third embodiment.

FIG. 10 is a block diagram showing an example of a configuration of a wireless power supply device according to a third embodiment. A wireless power supply device 1001 also performs power transmission using electromagnetic waves to an electronic device including a power receiver in a power supply area (not shown). As a difference from the first embodiment, a power supply processor of the third embodiment also redetermines a power supply time and a power supply time interval, based on statistic of communication information. The wireless power supply device 1001 includes an antenna 1002 including an antenna for detecting a wireless communication device and an antenna for wireless power supply, a power supply processor 1003 which performs power transmission, and a signal detector 1004 which detects communication information of at least one wireless communication device (not shown). The power supply processor 1003 includes a storage 1005 and the signal detector 1004 incorporates a statistic calculator 1006 which calculates the statistic of the communication information.

In the present embodiment, the power supply processor 1003 performs the power transmission according to plural elements of power supply information of the storage 1005, and a period relevant to the power transmission is used here. As the periods relevant to the power transmission, a time length for the wireless power supply device to sequentially perform the power transmission in one power transmission is called a power supply time. The wireless power supply device may perform the power transmission while taking a rest for a certain period or may continuously perform the power transmission. In addition, as the period relevant to the power transmission, a power supply time interval is a time interval from the time when the wireless power supply device ends the power transmission to the time when the wireless power supply device starts next power supply. Alternatively, the power supply time interval includes a time from the time when the wireless power supply device activates to the time when the wireless power supply device performs first power transmission.

It is assumed that a wireless communication device using substantially the same frequency band exists on the periphery of the wireless power supply device 1001. The wireless power supply device 1001 is controlled to perform the power transmission with priority if the communication information is not detected by the signal detector 1004, i.e., while communication of the other wireless communication device is not performed.

Since the antenna 1002, the signal detector 1004, and the storage 1005 are the same as those of the first embodiment, their explanations are omitted. The power supply processor 1003 can redetermine at least one of the power supply time and the power supply time interval in power transmission, similarly to the first embodiment. In addition, the power supply processor 1003 can also redetermine at least one of the power supply time and the power supply time interval in power transmission, based on the communication information detected by and the statistic calculated by the statistic calculator 1006. The redetermined period relevant to the power transmission is held in the storage 1005.

The statistic calculator 1006 performs at least one of reading the header storage information and decoding the data part in the communication of the wireless communication device, based on packets received by the signal detector 1004 and used for communication of the wireless communication device, and detects the communication information. The header storage information is information stored in a header of the packet sent from the wireless communication device and includes, for example, individual identification information of the wireless communication device, the packet length, the data amount, packet send prohibit period (Network Allocation Vector: NAV), data access category (AC) of Enhancement Distributed Channel Access (EDCA) function, and the like. The communication information obtained by decoding the data part are, for example, throughput, a packet error rate, and the like. Then, the statistic calculator 1006 calculates the statistic in the communication information detected by the signal detector 1004 and the communication information detected by the statistic calculator 1006. The statistic includes, for example, a mean value, a median, a distributed value, a standard deviation, a maximum value, a minimum value, a histogram, and the like. The communication information detected by the statistic calculator 1006 and the statistic calculated by the statistic calculator 1006 are held in the signal detector 1004 for a specific period.

In the present embodiment, the communication information includes not only the communication information described in the first embodiment, but also the communication information obtained by performing at least one of reading the header storage information and decoding the data part in the communication of the wireless communication device by the statistic calculator 1006, based on packets received by the signal detector 1004 and used for communication of the wireless communication device.

Figure 11:
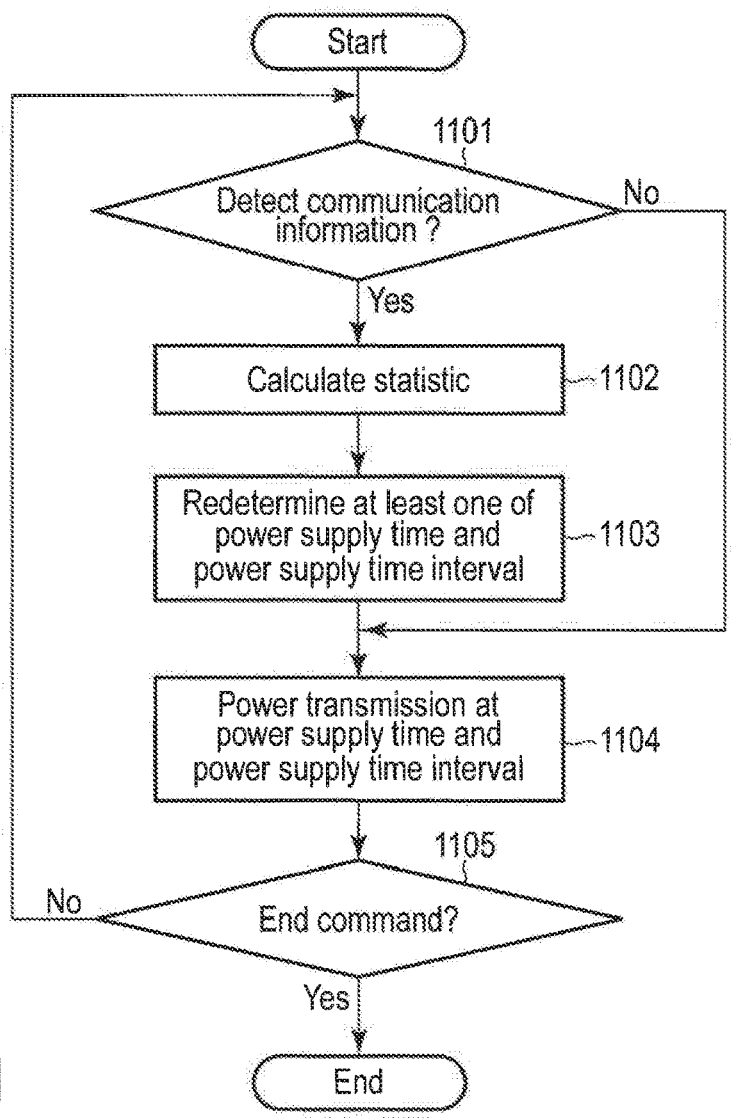
FIG. 11 is a flowchart illustrating an example of an operation of the wireless power supply device according to the third embodiment.

FIG. 11 is a flowchart illustrating an example of an operation of the wireless power supply device according to the third embodiment. An operation of the wireless power supply device according to the present embodiment will be explained with reference to FIG. 11. The initial value of the power supply time and the initial value of the power supply time interval are determined and preliminarily set in the storage 105. First, the signal detector 1004 attempts detection of the communication information of at least one wireless communication device (Step 1101).

If the signal detector 1004 cannot detect the communication information of the wireless communication device (step 1101: No), the power supply processor 1003 performs the power transmission at the initial value of the power supply time and the initial value of the power supply time interval (step 1104).

If the signal detector 1004 detects the communication information of the wireless communication device (step 1101: Yes), the statistic calculator 1006 performs at least one of reading the header storage information and decoding the data part, based on packets received by the signal detector 1004 and used for communication of the wireless communication device, and detects the communication information. The statistic calculator 1006 calculates the statistic, based on the communication information. (Step 1102). The signal detector 104 holds the communication information and the statistic for a specific period.

The power supply processor 1003 redetermines at least one of the power supply time and the power supply time interval, based on the statistic (step 1103). In addition, the calculation processing of the statistic and the redetermination processing may be performed before the signal detector 1004 stops detecting the signal.

Then, the power transmission is performed for the determined power supply time and the determined power supply time interval (step 1104). The frequency band of the electromagnetic waves for power transmission may be part of the communication frequency band or a frequency band other than the communication frequency band.

If the power transmission is ended, the wireless power supply device 1001 confirms whether an end command has arrived from the user (step 1105). The wireless power supply device 1001 may obtain the end command based on the input from the user, may obtain the end command from the signal including the end command received by the signal detector 104, or may obtain the end command from a human detection sensor which may be incorporated to the wireless power supply device for the purpose of protecting humans from radiated electromagnetic wave. If the end command is not confirmed, the flow returns to step 1101 and the signal detector 1004 attempts detection of the communication information of at least one wireless communication device. If the end command is confirmed, the flow ends.

The variation of the configuration can be variously modified similarly to the first embodiment. The configuration shown in FIG. 10 is a mere example, and the component elements may be mounted on a semiconductor integrated circuit (LSI, etc.) which is physically integrated, mounted on different semiconductor integrated circuits, or partially incorporated similarly to the configuration example of FIG. 10 in which the statistic calculator 1006 is provided in the signal detector 1004. In addition, the statistic calculated by the statistic calculator 1006 may be a value obtained by statistical processing using the values of the wireless communication devices or different values of the respective wireless communication devices. In addition, the communication information detected by the statistic calculator 1006 and the statistic calculated by the statistic calculator 1006 may be held in the storage 1005. The specific period for the signal detector 1004 to hold the statistic may not be a concrete time. For example, the specific period may be a period from the time when the wireless power supply device 1001 activates to the current time. The power supply processor 1003 may determine a Duty ratio instead of at least one of the power supply time and the power supply time interval. In addition, if the signal detector 1004 cannot detect the communication information (i.e., wireless communication is not performed) as a result of observing the communication frequency band for a specific time, the power supply processor 1003 may determine the power supply time interval to sequentially perform the power transmission. In addition, the power supply processor 1003 may set an end time. If this end time has passed, the end command is sent to the wireless power supply device 1001.

The initial value of the power supply time and the initial value of the power supply time interval are set in the storage 1005, as a first example of the third embodiment. The signal detector 1004 receives the communication signal of at least one wireless communication device and detects the communication information. The statistic calculator 1006 reads packet lengths from the packets detected by the signal detector 1004, as header storage information, and calculates the statistic of the packet lengths. The statistic calculator 1006 calculates a communication time required to send the statistical packet length. The signal detector 104 holds the communication information and the statistic for a specific period. The power supply processor 1003 redetermines the power supply time to be less than or equal to the communication time and holds the power supply time in the storage 1005. The power supply processor 1003 performs the power transmission for the power supply time.

For example, the initial value of the power supply time and the initial value of the power supply time interval are determined in the storage 1005. The signal detector 1004 receives the communication signal of at least one wireless communication device and detects the communication information. The statistic calculator 1006 reads packet lengths from the packets detected by the signal detector 1004, as header storage information, and calculates a mean value of the packet lengths of the wireless communication device. The statistic calculator 1006 calculates a communication time required to send the mean packet length. The signal detector 104 holds the communication information and the statistic for a specific period. Then, the power supply processor 1003 redetermines the power supply time to be less than or equal to the communication time and holds the power supply time in the storage 1005. Then, the power supply processor 1003 performs the power transmission for the power supply time.

In this example, the packets detected by the signal detector 1004 are not limited, but the statistic calculator 1006 may calculate the statistic of the packet lengths of the only packets including the data frame. In addition, the statistic can be variously changed to the median, the maximum value, the minimum value, and the like other than the mean value of the packet lengths. The power supply processor 1003 may not use the statistic, but use the required communication time of the packet length read by the statistic calculator 1006. In addition, the power supply processor 1003 may determine a Duty ratio instead of the power supply time.

In addition, in this example, the calculation processing of the statistic and the redetermination processing are performed after the signal detector 1004 stops detecting the signal, but may be performed before the signal detector 104 stops detecting the signal.

The initial value of the power supply time and the initial value of the power supply time interval are held in the storage 1005, as a second example of the third embodiment. The signal detector 1004 receives the communication signal of at least one wireless communication device and detects the communication information. The statistic calculator 1006 reads NAV (packet sending prohibit period) from the packets detected by the signal detector 1004, as header storage information, and calculates the statistic of NAV. The signal detector 104 holds the communication information and the statistic for a specific period. Then, the power supply processor 1003 redetermines the power supply time to be less than or equal to the statistic of NAV and holds the power supply time in the storage 1005. The power supply processor 1003 performs the power transmission for the power supply time.

For example, the initial value of the power supply time and the initial value of the power supply time interval are determined in the storage 1005. The signal detector 1004 receives the communication signal of at least one wireless communication device and detects the communication information. The statistic calculator 1006 reads NAV (packet sending prohibit period) from the packets detected by the signal detector 1004, as header storage information, and calculates a mean value of NAV as the statistic. The signal detector 104 holds the communication information and the statistic for a specific period. Then, the power supply processor 1003 redetermines the power supply time to be less than or equal to NAV and holds the power supply time in the storage 1005. The power supply processor 1003 performs the power transmission for the power supply time.

In this example, the mean value of NAV is calculated as the statistic, but the statistic can be variously changed to the median, the maximum value, the minimum value, and the like other than the mean value of NAV. The power supply processor 1003 may not use the statistic, but use NAV read by the statistic calculator 1006. In addition, the power supply processor 1003 may determine a Duty ratio instead of the power supply time.

In addition, in this example, the calculation processing of the statistic and the redetermination processing are performed after the signal detector 1004 stops detecting the signal, but may be performed before the signal detector 104 stops detecting the signal.

The initial value of the power supply time and the initial value of the power supply time interval are determined in the storage 1005, as a third example of the third embodiment. The signal detector 1004 receives the communication signal of at least one wireless communication device and detects the communication information. The statistic calculator 1006 reads AC in the send data of the wireless communication device from the packets detected by the signal detector 1004, calculates a histogram of AC as the statistic, and determines AC of the highest rate. The signal detector 104 holds the communication information and the statistic for a specific period. Then, the power supply processor 1003 redetermines the power supply time to be substantially the same as the communication time of the wireless communication device which sends the packets including the AC, redetermines the power supply time interval to be substantially the same as the out-of-communication time of the wireless communication device, and holds the power supply time and the power supply time interval in the storage 1005. The power supply processor 103 performs the power transmission at the power supply time and the power supply time interval.

In this example, the power supply processor 1003 redetermines both of the power supply time and the power supply time interval, but either of them may be redetermined or the Duty ratio may be determined. If a plurality of wireless communication devices sending the packets including AC of the highest rate exist, the statistic calculator 1006 may calculate the statistic of the communication time and the out-of-communication time.

In addition, in this example, the calculation processing of the statistic and the redetermination processing are performed after the signal detector 1004 stops detecting the signal, but may be performed before the signal detector 104 stops detecting the signal.

The initial value of the power supply time and the initial value of the power supply time interval are determined in the storage 1005, as a fourth example of the third embodiment. The signal detector 1004 receives the communication signal of at least one wireless communication device and detects the communication information. The statistic calculator 1006 decodes the data part of the wireless communication device, based on the packets detected by the signal detector 1004, and calculates a packet error rate of the wireless communication device. The signal detector 104 holds the communication information and the statistic for a specific period. The power supply processor 1003 redetermines at least one of the power supply time and the power supply time interval, based on the packet error rate. The power supply processor 1003 holds the redetermined period relevant to the power transmission in the storage 1005. The power transmission is performed for the power supply time and the power supply time interval.

For example, the initial value of the power supply time and the initial value of the power supply time interval are determined in the storage 1005. The signal detector 1004 receives the communication signal of at least one wireless communication device and detects the communication information. The statistic calculator 1006 decodes the data part of the wireless communication device, based on the packets detected by the signal detector 1004, and calculates a packet error rate of the wireless communication device. The signal detector 104 holds the communication information and the statistic for a specific period. If the packet error rate is lower than a specific threshold value, the power supply time is redetermined to be longer than a specific time and the power supply time interval is redetermined to be shorter than a specific time. If the packet error rate is higher than a specific threshold value, the power supply time is redetermined to be shorter than a specific time and the power supply time interval is redetermined to be longer than a specific time. The specific threshold value and the specific time are set by the power supply processor 1003. Then, the power supply processor 1003 performs the power transmission at the power supply time and the power supply time interval.

In this example, the power supply processor 1003 redetermines both of the power supply time and the power supply time interval, but either of them may be redetermined or the Duty ratio may be determined. The specific threshold value and the specific time may be set by the statistic calculator 1006 or held in the storage 1005.

In addition, in this example, the calculation processing of the statistic and the redetermination processing are performed after the signal detector 1004 stops detecting the signal, but may be performed before the signal detector 104 stops detecting the signal.

As described above, the initial value of the power supply time and the initial value of the power supply time interval are determined in the storage 1005, in the first to fourth examples of the present embodiment. The signal detector 1004 receives the communication signal of at least one wireless communication device and detects the communication information. The statistic calculator 1006 performs at least one of reading the header storage information and decoding the data part, based on the packets detected by the signal detector 1004, and detects the communication information. The statistic calculator 1006 calculates the statistic, based on the communication information. The signal detector 104 holds the communication information and the statistic for a specific period. The power supply processor 1003 redetermines at least one of the power supply time and the power supply time interval, based on the statistic. Furthermore, the power supply processor 1003 urges the storage 1005 to hold the period relevant to the power transmission and performs the power transmission at the power supply time and the power supply time interval. Thus, coexistence of the wireless power supply device and the wireless communication device can be implemented efficiently.

In addition, according to the present embodiment, since the wireless power supply device and at least one wireless communication device do not need to exchange communication signals, the existing wireless communication device and the wireless power supply device can coexist.

Fourth Embodiment

Figure 12:
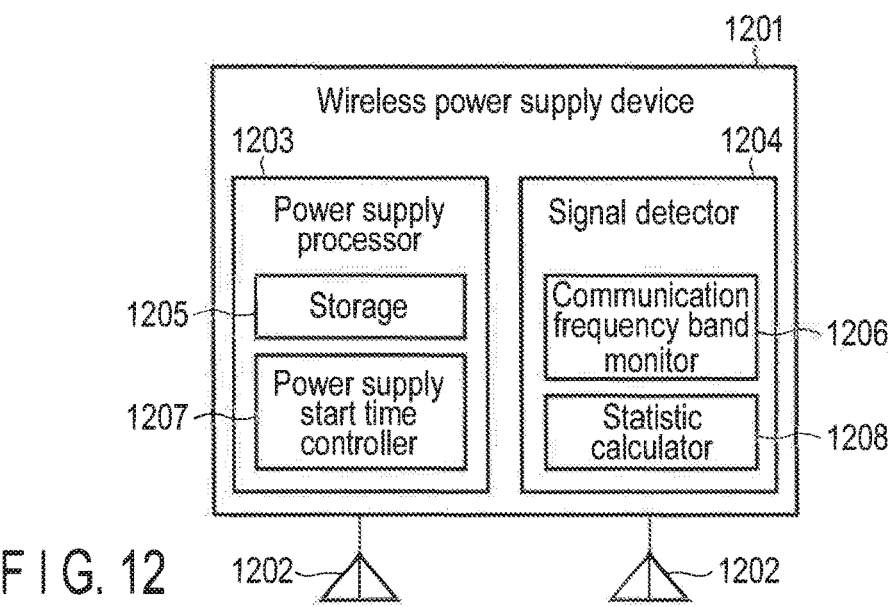
FIG. 12 is a block diagram showing an example of a configuration of a wireless power supply device according to a fourth embodiment.

FIG. 12 is a block diagram showing an example of a configuration of a wireless power supply device according to a fourth embodiment. A wireless power supply device 1201 also performs power transmission using electromagnetic waves to an electronic device including a power receiver in a power supply area (not shown). As a difference from the second embodiment, a power supply processor of the fourth embodiment also redetermines a power supply time and a standby time interval, based on statistic of communication information. The wireless power supply device 1201 includes an antenna 1202 including an antenna for detecting a wireless communication device and an antenna for wireless power supply, a power supply processor 1203 which performs power transmission, and a signal detector 1204 which detects information indicative of a status of communication of at least one wireless communication device (not shown). The power supply processor 1203 includes a power supply start time controller 1207 together with a storage 1205. The signal detector 1204 includes a statistic calculator 1208 which calculates the statistic of the communication information together with a communication frequency band monitor 1206 which monitors the conditions of use of one or more communication frequency bands. That is, the wireless power supply device 1201 is the wireless power supply device of the second embodiment which newly includes a statistic calculator of the third embodiment.

In the present embodiment, the power supply processor 1203 performs the power transmission according to plural elements of power supply information of the storage 1205, and a period relevant to the power transmission is used here. As the periods relevant to the power transmission, a time length for the wireless power supply device to sequentially perform the power transmission in one power transmission is called a power supply time. The wireless power supply device may perform the power transmission while taking a rest for a certain period or may continuously perform the power transmission. In addition, as the period relevant to the power transmission, the standby time interval is a time interval from the time when the wireless power supply device determines that communication of the other wireless communication device is not performed to the time when the power supply starts.

In the present embodiment, the communication information includes not only the communication information described in the first embodiment, but also the communication information obtained by performing at least one of reading the header storage information and decoding the data part in the communication of the wireless communication device by the statistic calculator 1208, based on packets received by the signal detector 1204 and used for communication of the wireless communication device.

It is assumed that a wireless communication device using substantially the same frequency band exists on the periphery of the wireless power supply device 1201. The wireless power supply device 1201 is controlled to stand by for a certain time, too, if the communication information is not detected by the signal detector 1204, i.e., while communication of the other wireless communication device is not performed, and to perform the power transmission if the communication information is not detected for the period.

Since operations of the antenna 1202, the signal detector 1204, the storage 1205, and the communication frequency band monitor 1206 are the same as the second embodiment and the operation of the statistic calculator 1208 is the same as the third embodiment, their explanations are omitted. The power supply start time controller 1207 incorporated in the power supply processor 1203 can redetermine the standby time interval, based on not only the condition of use of the communication frequency band, but the communication information detected by the statistic calculator 1208 and the statistic calculated by the statistic calculator 1208. The power supply processor 1203 can redetermine the power supply time, based on not only the communication information, but also the communication information detected by the statistic calculator 1208 and the statistic calculated by the statistic calculator 1208. That is, the power supply processor 1203 can redetermine at least one of the power supply time and the standby time interval in power transmission.

Figure 13:
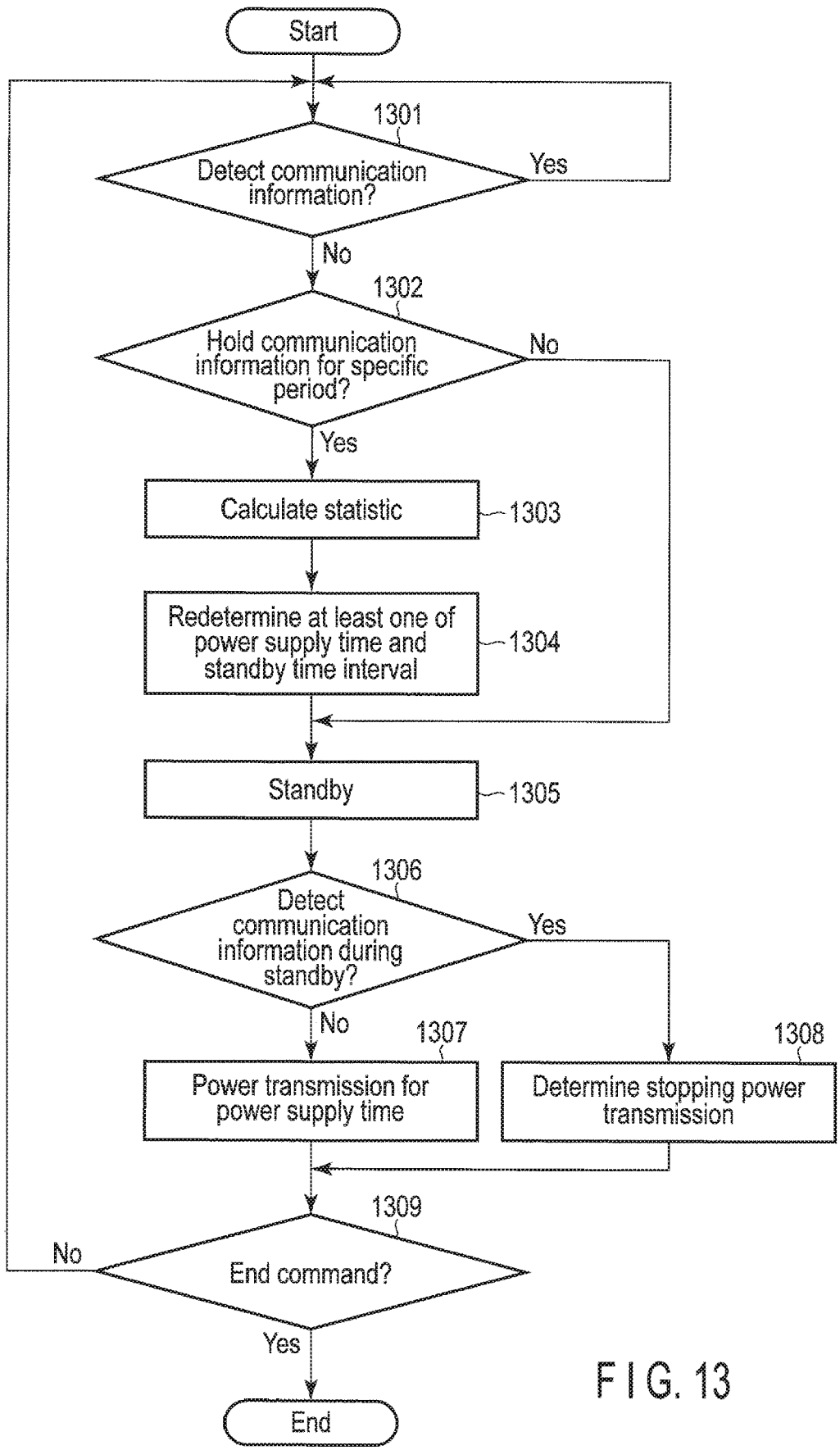
FIG. 13 is a flowchart illustrating an example of an operation of the wireless power supply device according to the fourth embodiment.

FIG. 13 is a flowchart illustrating an example of an operation of the wireless power supply device according to the fourth embodiment. An operation of the wireless power supply device according to the present embodiment will be explained with reference to FIG. 13. First, the initial value of the power supply time and the initial value of the standby time interval are determined and set in the storage 1205.

Next, the signal detector 1204 receives the communication signal of at least one wireless communication device via the antenna 1202, and performs at least one of decoding, frequency analysis, received power analysis, and propagation characteristic analysis. The signal detector 1204 attempts detection of the communication information of the wireless communication device through them (step 1301).

If the signal detector 1204 detects the communication information (step 1301: Yes), the statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information until a specific period. The signal detector 1204 may urge the storage 1205 to hold the detected communication information. The communication frequency band monitor 1206 notifies the power supply processor 1203 and the power supply start time controller 1207 that the communication frequency band in which the communication information has been detected is busy. Then, the flow returns to step 1301 again. If the signal detector 1204 does not detect the communication information (step 1301: No), the communication frequency band monitor 1206 notifies the power supply processor 1203 and the power supply start time controller 1207 that the communication frequency band is idle.

Next, the power supply processor 1203 confirms whether the signal detector 1204 holds the communication information (step 1302). The power supply processor 1203 may confirm whether the storage 1205 holds the communication information. If the signal detector 1204 or the storage 1205 holds the communication information (step 1302: Yes), a statistic calculator 1208 calculates the statistic of the communication information (Step 1303). At least one of the redetermination of the power supply time performed by the power supply processor 1203 and the redetermination of the standby interval time performed by the power supply start time controller 1207 is performed based on the statistic. In addition, the power supply processor 1203 holds the redetermined period relevant to the power transmission in the storage 1205 (step 1304). In addition, the calculation processing of the statistic and the redetermination processing may be performed before the signal detector 104 stops detecting the signal.

At least one of the redetermination of the power supply time performed by the power supply processor 1203 and the redetermination of the standby interval time performed by the power supply start time controller 1207 may be performed based on the communication information. In contrast, if the signal detector 1204 or the storage 1205 does not hold the communication information or the statistic (step 1302: No), redetermination of the power supply time and the standby time interval is not performed.

Next, the power supply processor 1203 does not perform the power supply immediately, but stands by for the standby interval time (step 1305). The signal detector 1204 attempts detection of the communication information of the wireless communication device during standby of the power supply processor 1203, too (step 1306). If the signal detector 1204 detects the communication information during standby of the power supply processor 1203 (step 1306: Yes), the statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information until a specific period. The communication frequency band monitor 1206 notifies the power supply processor 1203 that the communication frequency band in which the communication information has been detected is busy. The power supply processor 1203 determines that the power transmission is not performed even after standing by for the standby interval time (step 1308).

If the signal detector 1204 does not detect the communication information during standby of the power supply processor 1203 (step 1306: No), the communication frequency band monitor 1206 notifies the power supply processor 1203 that the communication frequency band in which the communication information has been detected is idle. The power supply processor 1203 performs the power transmission for the power supply time (step 1307). The frequency band of the electromagnetic waves for power transmission may be part of the communication frequency band or a frequency band other than the communication frequency band.

If the power transmission is ended, the wireless power supply device 1201 confirms whether an end command has arrived from the user (step 1309). The wireless power supply device 1201 may obtain the end command based on the input from the user, may obtain the end command from the signal including the end command received by the signal detector 1204, or may obtain the end command from a human detection sensor which may be incorporated to the wireless power supply device for the purpose of protecting humans from radiated electromagnetic wave. If the end command is not confirmed, the flow returns to step 1301 and the signal detector 1204 attempts detection of the communication information of at least one wireless communication device. If the end command is confirmed, the flow ends.

The variation of the configuration can be variously modified similarly to the second embodiment. The configuration shown in FIG. 12 is a mere example, and the component elements may be mounted on a semiconductor integrated circuit (LSI, etc.) which is physically integrated, mounted on different semiconductor integrated circuits, or partially incorporated similarly to the configuration example of FIG. 12 in which the communication frequency band monitor 1206 and the statistic calculator 1208 are provided in the signal detector 1204. In addition, if the signal detector 1204 cannot detect the communication information (i.e., wireless communication is not performed) as a result of observing the communication frequency band for a specific time, the power supply start time controller 1207 may redetermine the standby time interval so as to sequentially perform the power transmission. The frequency band in which the power supply processor 1203 performs power transmission may be part of the communication frequency band or a frequency band other than the communication frequency band. The statistic calculated by the statistic calculator 1206 may be a value obtained by statistical processing using the values of the wireless communication devices or different values of the respective wireless communication devices. In addition, the calculated statistic may be held in the storage 1205 or held in the statistic calculator 1206. The specific period for the signal detector 1204 to hold the statistic may not be a concrete time. For example, the specific period may be a period from the time when the wireless power supply device 1201 activates to the current time.

As a first example of the fourth embodiment, the initial value of the standby time interval and the initial value of the power supply time are set in the storage 1205. The signal detector 1204 attempts detection of the communication information of at least one wireless communication device. If the communication frequency band is busy, the signal detector 1204 continues detecting the communication information. The statistic calculator 1208 performs at least one of reading the header storage information and decoding the data part in the communication of the wireless communication device, based on packets received by the signal detector and used for communication of the wireless communication device, and detects the communication information different from the communication information detected by the signal detector 1204. The signal detector 1204 holds the communication information for a specific period.

If the communication frequency band is idle and if the communication information exists in the signal detector 1204, the statistic calculator 1208 calculates the statistic of the communication information. The signal detector 1204 holds the statistic for a specific period, too. At least one of the redetermination of the standby time interval performed by the power supply start time controller 1207 and the redetermination of the power supply time performed by the power supply processor 1203 is performed based on the statistic. The power supply start time controller 1207 and the power supply processor 1203 may perform redetermination, based on the communication information. The power supply processor 1203 holds the redetermined period relevant to the power transmission in the storage 1205. If the communication information or the statistic does not exist in the signal detector 1204, redetermination of the standby time interval and power supply time is not performed.

Even if the communication frequency band is idle, the power supply processor 1203 does not immediately perform power transmission but stands by for the standby time interval. If the communication frequency band becomes busy during standby of the power supply processor 1203, the signal detector 1204 continues detecting the communication information. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the communication information for a specific period. The power supply processor 1203 does not perform power transmission even after ending standby. If the communication frequency band is also idle during standby of the power supply processor 1203, the power supply processor 1203 performs power transmission for the power supply time after ending standby.

For example, the initial value of the power supply time and the initial value of the standby time interval are set in the storage 1205. The signal detector 1204 receives the communication signal of at least one wireless communication device and detects the communication information. The statistic calculator 1208 reads packet lengths from the packets detected by the signal detector 1204, as header storage information, and calculates an average value of the packet lengths of the wireless communication device. The signal detector 1204 holds the communication information and the statistic for a specific period. In addition, the statistic calculator 1208 calculates a communication time required to send the average packet length. Then, the power supply processor 1203 redetermines the power supply time to be less than or equal to the communication time and holds the power supply time in the storage 1205. Then, the power supply processor 1203 performs the power transmission for the power supply time.

In this example, the packets detected by the signal detector 1204 are not limited, but the statistic calculator 1208 may calculate the statistic of the packet lengths of the only packets including the data frame. In addition, the statistic can be variously changed to the median, the maximum value, the minimum value, and the like other than the mean value of the packet lengths. The power supply processor 1203 may not use the statistic, but use the required communication time of the packet length read by the statistic calculator 1208. In addition, the power supply start time controller 1207 may redetermine the standby time interval.

In addition, redetermination of the power supply time and redetermination of the standby time interval are performed after the communication frequency band becomes idle, but these redeterminations may be performed while the communication frequency band is busy.

Besides the above, the statistic calculated and the communication information detected by the statistic calculator 1208 are variously considered similarly to the second to fourth examples of the third embodiment. The power supply start time controller 1207 can redetermine the standby time interval and the power supply processor 1203 can redetermine the power supply time, based on the statistic and the communication information including the communication information detected by the signal detector 1204.

As the second example of the fourth embodiment, the wireless power supply device 1201 performs the power transmission in CSMA/CA. The wireless communication device is assumed to perform communication using wireless LAN, and the wireless communication device is called a wireless LAN terminal. The initial value of the standby time interval and the initial value of the power supply time are set in the storage 1205, and DIFS is set as the initial value of the standby time interval. The signal detector 1204 attempts detection of the communication information of at least one wireless LAN terminal.

In a case where the communication frequency band is idle, if the communication information exists in the signal detector 1204, the statistic calculator 1208 calculates the statistic of the communication information. In addition, the power supply start time controller 1207 redetermines DIFS of wireless LAN standards as the standby interval time. The power supply processor 1203 redetermines the power supply time, based on the statistic or the communication information. Either of the redeterminations may be performed. The power supply processor 1203 holds the redetermined period relevant to the power transmission in the storage 1205. If the communication information does not exist in the signal detector 1204, redetermination of the standby time interval and power supply time is not performed.

After that, the power supply processor 1203 does not immediately perform power transmission but stands by for DIFS. If the communication frequency band becomes busy during standby of the power supply processor 1203, the signal detector 1204 continues detecting the communication information. The statistic calculator 1208 performs at least one of reading the header storage information and decoding the data part in the communication of the wireless communication device, based on packets received by the signal detector and used for communication of the wireless communication device, and detects the communication information different from the communication information detected by the signal detector 1204. The signal detector 1204 holds the communication information for a specific period. The power supply processor 1203 does not perform power transmission even after ending standby. If the communication frequency band is also idle during standby of the power supply processor 1203, the power supply processor 1203 performs power transmission for the power supply time after ending standby.

In contrast, if the communication frequency band is busy, the signal detector 1204 continues detecting the communication information. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the communication information for a specific period.

If the status of the communication frequency band is changed from busy to idle, the statistic calculator 1208 calculates the statistic of the communication information. The signal detector 1204 holds the statistic for a specific period. The power supply start time controller 1207 redetermines DIFS+BOF as the standby time interval. The power supply processor 1203 redetermines the power supply time, based on the statistic or the communication information. Either of the redeterminations of the standby time interval and the power supply time may be performed. In addition, the calculation processing of the statistic and the redetermination processing may be performed before the status of the communication frequency band is changed to idle. The power supply processor 1203 holds the redetermined period relevant to the power transmission in the storage 1205.

After that, the power supply processor 1203 does not immediately perform power transmission but stands by for DIFS+BOF. If the communication frequency band becomes busy during standby of the power supply processor 1203, the signal detector 1204 continues detecting the communication information. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the communication information for a specific period. The power supply processor 1203 does not perform power transmission even after ending standby. If the communication frequency band is idle during standby of the power supply processor 1203, the power supply processor 1203 performs power transmission for the power supply time after ending standby.

In this case, too, the statistic calculated and the communication information detected by the statistic calculator 1208 are variously considered similarly to the first to fourth examples of the third embodiment. The power supply start time controller 1207 redetermines the standby time interval and the power supply processor 1203 redetermines the power supply time, based on the statistic and the communication information including the communication information detected by the signal detector 1204.

As described above, in the first example of the present embodiment, the initial value of the standby time interval and the initial value of the power supply time are set in the storage 1205. The signal detector 1204 attempts detection of the communication information of the wireless communication device. If the signal detector 1204 detects the communication information, the statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information until a specific period and continues the detection. The communication frequency band monitor 1206 notifies the power supply processor 1203 and the power supply start time controller 1207 that the communication frequency band in which the communication information has been detected is busy.

If the signal detector 1204 does not detect the communication information, the communication frequency band monitor 1206 notifies the power supply processor 1203 and the power supply start time controller 1207 that the communication frequency band is idle. If the communication information for a specific period is held in the signal detector 1204, a statistic calculator 1208 calculates the statistic from the communication information. The signal detector 1204 holds the statistic for a specific period. At least one of the redetermination of the power supply time performed by the power supply processor 1203 and the redetermination of the standby interval time performed by the power supply start time controller 1207 is performed based on the statistic and the communication information. The power supply processor 1203 holds the redetermined period relevant to the power transmission in the storage 1205. After that, the power supply processor 1203 does not perform the power supply immediately but stands by for the standby interval time.

The signal detector 1203 attempts detection of the communication information of the wireless communication device during standby of the power supply processor 1203, too. If the signal detector 1204 detects the communication information during standby of the power supply processor 1203, the statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information until a specific period. The communication frequency band monitor 1206 notifies the power supply processor 1203 that the communication frequency band in which the communication information has been detected is busy. The power supply processor 1203 determines that the power transmission is not performed even after standing by for the standby interval time.

If the signal detector 1204 does not detect the communication information during standby of the power supply processor 1203, the communication frequency band monitor 1206 notifies the power supply processor 1203 that the communication frequency band in which the communication information has been detected is idle. The power supply processor 1203 performs the power transmission for the power supply time after ending standby. Thus, interference between wireless power supply device and the wireless communication device occurs more hardly, and coexistence of the wireless power supply device and the wireless communication device can be implemented efficiently.

In the second example of the present embodiment, the wireless power supply device 1201 performs the power transmission in CSMA/CA in wireless LAN. The initial value of the standby time interval and the initial value of the power supply time are set in the storage 1205, and DIFS is set as the initial value of the standby time interval. The signal detector 1204 attempts detection of the communication information of the wireless communication device.

In a case where the signal detector 1204 cannot detect the communication information, if the communication information for a specific period is held in the signal detector 1204, the statistic calculator 1208 calculates the statistic based on the communication information. The signal detector 1204 holds the statistic for a specific period. At least one of the redetermination of the power supply time performed by the power supply processor 1203 and the redetermination of the standby interval time performed by the power supply start time controller 1207 is performed based on the statistic and the communication information. The power supply processor 1203 holds the redetermined period relevant to the power transmission in the storage 1205. The communication frequency band monitor 1206 notifies the power supply processor 1203 and the power supply start time controller 1207 that the communication frequency band is idle.

After that, the power supply processor 1203 does not immediately perform power transmission but stands by for DIFS. If the communication frequency band monitor 1206 notifies the power supply processor 1203 that the communication frequency band is continuously idle, during DIFS, the power supply processor 1203 starts power supply after DIFS has passed. If the communication frequency band monitor 1206 notifies the power supply processor 1203 that the communication frequency band is busy, during DIFS, the signal detector 1204 continues detecting the communication information. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the communication information for a specific period. The power supply processor 1203 determines that the power transmission is not performed even if standby is ended in DIFS.

If the signal detector 1204 can detect the communication information after determination of the initial value of the standby time interval and the initial value of the power supply time, the communication frequency band monitor 1206 notifies the power supply processor 1203 and the power supply start time controller 1207 that the communication frequency band is busy. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information for a specific period and continues detecting the communication information.

If the signal detector 1204 becomes unable to detect the communication information, the communication frequency band monitor 1206 notifies the power supply processor 1203 and the power supply start time controller 1207 that the communication frequency band is idle. The power supply start time controller 1207 redetermines the time obtained by adding BOF to DIFS as the standby time interval, and notifies the power supply processor 1203 of the time. The power supply processor 1203 redetermines the power supply time, based on the communication information, urges the storage 1205 to hold the redetermined period relevant to the power transmission, and starts standby. In contrast, the wireless LAN terminal also determines the time obtained by adding BOF to DIFS and starts standby.

If the device previously ending standby is a wireless LAN terminal, the communication is performed in the communication frequency band. The signal detector 1204 detects the communication information of the wireless LAN terminal. The statistic calculator 1208 performs at least one of reading the header storage information and decoding the data part in the communication of the wireless communication device, based on packets received by the signal detector 1204 and used for communication of the wireless communication device, and detects the communication information different from the communication information detected by the signal detector 1204. The signal detector 1204 holds the detected communication information until a specific period. The communication frequency band monitor 1206 notifies the power supply processor 1203 that the communication frequency band is busy. The power supply processor 1203 determines that power transmission is not performed even if standby is ended. If the device first ending standby is the wireless power supply device 1201, power supply is performed. Thus, impartial coexistence of the wireless power supply device and the wireless LAN terminal can be implemented and coexistence of the wireless power supply device and the wireless communication device can be implemented efficiently, from the viewpoint of an opportunity of connection to the communication frequency band.

In addition, according to the present embodiment, since the wireless power supply device and at least one wireless communication device do not need to exchange communication signals, the existing wireless communication device and the wireless power supply device can coexist.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus performing power transmission to a power receiver, using electromagnetic waves, the electronic apparatus comprising:
   a signal detector configured to detect a communication time of at least one wireless communication apparatus that is different from the power receiver, based on a wireless signal transmitted from the at least one wireless communication apparatus different from the power receiver; and
   processor circuitry configured to:
   determine at least one of (1) a first period to wait from a timing of when power transmission is ended to a timing of when power transmission is started, (2) a second period to wait from a timing of when the wireless signal is not detected to a timing of when power transmission is started, and (3) a third period for continuously performing power transmission, based on the detected communication time of the at least one wireless communication apparatus different from the power receiver; and
   transmit, to the power receiver, a power with electromagnetic wave according to at least one of the first period, the second period, and the third period.

2. The electronic apparatus of claim 1, wherein
   the communication time is obtained from at least one of confirmation of presence of the wireless signal, reception of the wireless signal, decoding of the wireless signal, frequency analysis, received power analysis, and propagation characteristic analysis, performed by a signal detector; and
   the second period comprises a period to wait from a timing of when the wireless signal is not detected to a timing of when power transmission is started.

3. The electronic apparatus of claim 1, wherein
   the signal detector comprises a statistic calculator configured to perform at least one of detection of at least one communication information element in a header in a packet of communication of the wireless communication apparatus and detection of at least one communication information element obtained by decoding the packet of communication of the wireless communication apparatus, and to calculate statistic of communication information, and the processor circuitry is configured to determine at least one of the first period, the second period, and the third period based on at least one of the communication information and the statistic.

4. The electronic apparatus of claim 1, wherein the processor circuitry is configured to stand by for the second period from a timing of when the wireless signal is not detected and perform power transmission for the third period if the wireless signal is not detected for the second period.

5. The electronic apparatus of claim 1, wherein a total time of the first period and the third period is less than or equal to the communication time of the wireless communication apparatus.

6. The electronic apparatus of claim 1, wherein a total time of the second period and the third period is less than or equal to a communication cycle of the wireless communication apparatus.

7. An electronic apparatus, comprising:
  a signal detector configured to detect a wireless signal transmitted from at least one wireless communication apparatus; and
  processor circuitry configured to stand by for a second period if the wireless signal is not detected, and transmit a power with electromagnetic wave for a third period if the wireless signal is not detected during standby,
  wherein
  the second period is a period to wait from a timing of when the wireless signal is not detected to a timing of when power transmission is started, and
  the third period is a period for continuously performing power transmission.

8. An electronic apparatus performing power transmission to a power receiver, using electromagnetic waves, comprising:
  processor circuitry configured to transmit, to the power receiver, a power with electromagnetic wave based on a plurality of power supply information elements; and
  a signal detector configured to detect a communication time of at least one wireless communication apparatus that is different from the power receiver,
  wherein the processor circuitry is configured to change at least one of elements of the power supply information with the detected communication time of the at least one wireless communication apparatus that is different from the power receiver, and performs subsequent power transmission with the changed power supply information.

9. The electronic apparatus of claim 8, wherein the processor circuitry is configured to change at least one of a first period to wait from a timing of when power transmission is ended to a timing of when next power transmission is started, a second period to wait from a timing of when the communication time is not detected to a timing of when power transmission is started, and a third period for continuously performing power transmission, with the communication time.

10. The electronic apparatus of claim 1, wherein
  the wireless communication apparatus is a communication apparatus using wireless LAN, and
  the second period is any one of DIFS or a total time of DIFS and BOF, in CSMA/CA protocol.

11. A method comprising:
  detecting a wireless signal transmitted from at least one wireless communication apparatus; and
  standing by for a second period if the wireless signal is not detected, and transmitting a power with electromagnetic wave for a third period if the wireless signal is not detected during standby,
  wherein:
  the second period is a period to wait from a timing of when the wireless signal is not detected to a timing of when power transmission is started, and
  the third period is a period for continuously performing power transmission.

* * * * *